(12) United States Patent
Thompson et al.

(10) Patent No.: US 10,081,711 B2
(45) Date of Patent: *Sep. 25, 2018

(54) ANTI-AGGLOMERANTS FOR THE RUBBER INDUSTRY

(71) Applicant: ARLANXEO SINGAPORE PTE. LTD., Singapore (SG)

(72) Inventors: David Thompson, London (CA); Clinton Lund, London (CA)

(73) Assignee: ARLANXEO Singapore Pte. Ltd., Singapore (SG)

(*) Notice: Subject to any disclaimer, the term of this patent is extended or adjusted under 35 U.S.C. 154(b) by 0 days.

This patent is subject to a terminal disclaimer.

(21) Appl. No.: 15/107,324

(22) PCT Filed: Dec. 22, 2014

(86) PCT No.: PCT/CA2014/051248
§ 371 (c)(1),
(2) Date: Jun. 22, 2016

(87) PCT Pub. No.: WO2015/095959
PCT Pub. Date: Jul. 2, 2015

(65) Prior Publication Data
US 2016/0347913 A1 Dec. 1, 2016

(30) Foreign Application Priority Data

Dec. 23, 2013 (EP) .................................. 13199466
Mar. 19, 2014 (EP) .................................. 14160714
Jun. 30, 2014 (EP) .................................. 14175016
Jul. 7, 2014 (EP) .................................. 14175973

(51) Int. Cl.
*C08J 3/07* (2006.01)
*C08L 23/22* (2006.01)

(52) U.S. Cl.
CPC .................. *C08J 3/07* (2013.01); *C08L 23/22* (2013.01); *C08J 2323/22* (2013.01); *C08J 2401/28* (2013.01); *C08L 2201/54* (2013.01)

(58) Field of Classification Search
CPC ...... C08J 3/07; C08J 2323/22; C08J 2401/28; C08L 23/22; C08L 2201/54
See application file for complete search history.

(56) References Cited

U.S. PATENT DOCUMENTS

| 3,287,440 | A | 11/1966 | Giller |
| 4,059,651 | A | 11/1977 | Smith, Jr. |
| 4,946,899 | A | 8/1990 | Kennedy et al. |
| 7,723,447 | B2 | 5/2010 | Milner et al. |
| 8,329,108 | B2 | 12/2012 | Lovegrove et al. |
| 8,415,432 | B1 | 4/2013 | Mruk et al. |
| 8,747,756 | B2 | 6/2014 | Feller et al. |
| 9,068,031 | B2 | 6/2015 | Paul et al. |
| 9,156,932 | B2 | 10/2015 | Mruk et al. |
| 2007/0015853 | A1* | 1/2007 | Weng ............ B82Y 30/00 523/333 |
| 2007/0213444 | A1* | 9/2007 | Weng ............ C08F 210/12 524/394 |
| 2012/0264872 | A1 | 10/2012 | Weiss et al. |
| 2013/0157071 | A1 | 6/2013 | Fujii |

FOREIGN PATENT DOCUMENTS

| CA | 2 198 473 | * | 3/1996 |
| CA | 2 458 750 | * | 8/2005 |
| EP | 2 607 102 | * | 6/2013 |
| JP | 2008013608 A2 | | 1/2008 |
| JP | 2013032422 A2 | | 2/2013 |

OTHER PUBLICATIONS

DIN EN 1890, German Standard Specification, Sep. 2006, Standards Committee Materials Testing, Abstract, available at https://www.din/de/en/getting-involved/standards-committees/nmp/standards, two pages.
Kirk-Othmer Encyclopedia of Chemical Technology, Bearing Materials to Carbon, vol. 4, 1992, John Wiley & Sons, Bibliographic Information, two pages.
Vold, Marjorie J., et al., "Crystal forms of anhydrous calcium stearate derivable from calcium stearate monohydrate", Journal of Colloid Science, vol. 4, Issue 2, Apr. 1949, pp. 93-101, Abstract, two pages.
Mildenberg, R., et al., Chapter 5, Applications, Hydrocarbon Resins, VCH Verlag, 1997, pp. 75-154.
Encyclopedia of Polymer Science and Engineering, vol. 4, Composites, Fabrication to Die Design, Compounding, 1986, John Wiley & Sons, 18 pages.
International Search Report from International Application No. PCT/CA2014/051248, dated Apr. 17, 2015, two pages.
Supplementary European Search Report from European Application No. 14875732, dated Jul. 26, 2017, two pages.

* cited by examiner

*Primary Examiner* — Robert Harlan

(57) ABSTRACT

The invention relates to a method to reduce or prevent agglomeration of rubber particles in aqueous media by LCST compounds and elastomers obtained thereby. The invention further relates to elastomer products comprising the same or derived therefrom.

24 Claims, No Drawings

ANTI-AGGLOMERANTS FOR THE RUBBER INDUSTRY

FIELD OF THE INVENTION

The invention relates to a method to reduce or prevent agglomeration of rubber particles in aqueous media by LCST compounds and elastomers obtained thereby. The invention further relates to elastomer products comprising the same or derived therefrom.

BACKGROUND

Rubbers in particular those comprising repeating units derived from isoolefins are industrially prepared by carbo-cationic polymerization processes. Of particular importance is butyl rubber which is a elastomer of isobutylene and a smaller amount of a multiolefin such as isoprene.

The carbocationic polymerization of isoolefins and its elastomerization with multiolefins is mechanistically complex. The catalyst system is typically composed of two components: an initiator and a Lewis acid such as aluminum trichloride which is frequently employed in large scale commercial processes.

Examples of initiators include proton sources such as hydrogen halides, alcohols, phenols, carboxylic and sulfonic acids and water.

During the initiation step, the isoolefin reacts with the Lewis acid and the initiator to produce a carbenium ion which further reacts with a monomer forming a new carbenium ion in the so-called propagation step.

The type of monomers, the type of diluent or solvent and its polarity, the polymerization temperature as well as the specific combination of Lewis acid and initiator affects the chemistry of propagation and thus monomer incorporation into the growing polymer chain.

Industry has generally accepted widespread use of a slurry polymerization process to produce butyl rubber, polyisobutylene, etc. in methyl chloride as diluent. Typically, the polymerization process is carried out at low temperatures, generally lower than −90° C. Methyl chloride is employed for a variety of reasons, including that it dissolves the monomers and aluminum chloride catalyst but not the polymer product. Methyl chloride also has suitable freezing and boiling points to permit, respectively, low temperature polymerization and effective separation from the polymer and unreacted monomers. The slurry polymerization process in methyl chloride offers a number of additional advantages in that a polymer concentration of up to 40 wt.-% in the reaction mixture can be achieved, as opposed to a polymer concentration of typically at maximum 20 wt.-% in solution polymerizations. An acceptable relatively low viscosity of the polymerization mass is obtained enabling the heat of polymerization to be removed more effectively by surface heat exchange. Slurry polymerization processes in methyl chloride are used in the production of high molecular weight polyisobutylene and isobutylene-isoprene butyl rubber polymers.

In a butyl rubber slurry polymerization, the reaction mixture typically comprises the butyl rubber, diluent, residual monomers and catalyst residues. This mixture is either batchwise or more commonly in industry continuously transferred into a vessel with water containing an anti-agglomerant which for all existing commercial grades today is a fatty acid salt of a multivalent metal ion, in particular either calcium stearate or zinc stearate in order to form and preserve butyl rubber particles, which are more often referred to as □butyl rubber crumb□ and optionally but preferably a stopper which is typically an aqueous sodium hydroxide solution to neutralize initiator residues.

The water in this vessel is typically steam heated to remove and recover diluent and unreacted monomers.

As a result thereof a slurry of butyl rubber particles is obtained which is then subjected to dewatering to isolate butyl rubber particles. The isolated butyl rubber particles are then dried, baled and packed for delivery.

The anti-agglomerant ensures that in the process steps described above the butyl rubber particles stay suspended and show a reduced tendency to agglomerate.

In the absence of an anti-agglomerant the naturally high adhesion of butyl rubber would lead to rapid formation of a non-dispersed mass of rubber in the process water, plugging the process. In addition to particle formation, sufficient anti-agglomerant must be added to delay the natural tendancy of the formed butyl rubber particles to agglomerate during the stripping process, which leads to fouling and plugging of the process.

The anti-agglomerants in particular calcium and zinc stearates function as a physical-mechanical barrier to limit the close contact and adhesion of butyl rubber particles.

The physical properties required of these anti-agglomerants are a very low solubility in water which is typically below 20 mg per liter under standard conditions, sufficient mechanical stability to maintain an effective barrier, and the ability to be later processed and mixed with the butyl rubber to allow finishing and drying.

The fundamental disadvantage of fatty acid salts of a mono- or multivalent metal ion, in particular sodium, potassium calcium or zinc stearate or palmitate is their chemical interaction with rubber cure systems, for example causing slower cure times in resin cured compounds in particular those comprising isoprene-isoolefin elastomers.

A variety of other elastomers either obtained after polymerization or after post-polymerization modification in organic solution or slurry are typically subjected to an aqueous workup where the same problems apply as well.

Therefore, there is still a need for providing a process for the preparation of elastomer particles in aqueous media having reduced or low tendency of agglomeration.

SUMMARY OF THE INVENTION

According to one aspect of the invention, there is provided a process for the preparation of an aqueous slurry comprising a plurality of elastomer particles suspended therein, the process comprising at least the step of:

A) contacting an organic medium comprising
  i) at least one elastomer and
  ii) an organic diluent
  with an aqueous medium comprising at least one LCST compound having a cloud point of 0 to 100° C., preferably 5 to 100° C., more preferably 15 to 80° C. and even more preferably 20 to 70 and
B) removing at least partially the organic diluent to obtain the aqueous slurry comprising the elastomer particles.

DETAILED DESCRIPTION OF THE INVENTION

The invention also encompasses all combinations of preferred embodiments, ranges parameters as disclosed hereinafter with either each other or the broadest disclosed range or parameter.

The term elastomers include any polymer showing elastomeric behaviour. Examples of synthetic rubbers include but are not limited to butyl rubbers and halogenated butyl rubbers, polyisobutylene, ethylene propylene diene M-class rubbers (EPDM), nitrile butadiene rubbers (NBR), hydrogenated nitrile butadiene rubbers (HNBR) and styrene-butadiene rubbers (SBR).

In one embodiment the organic medium comprising at least one elastomer and an organic diluent is obtained from a polymerization reaction or a post-polymerization reaction such as halogenation.

Where the organic medium comprising at least one elastomer and an organic diluent is obtained from a polymerization reaction the medium may further contain residual monomers of the polymerization reaction.

The aqueous medium may further contain non-LCST compounds whereby the non-LCST compounds are
  selected from the group consisting of ionic or non-ionic surfactants, emulsifiers, and antiagglomerants or are in another embodiment
  salts of (mono- or multivalent) metal ions or are in another embodiment
  carboxylic acid salts of multivalent metal ions or are in another embodiment
  stearates or palmitates of mono- or multivalent metal ions or are in another embodiment
  calcium and zinc stearates or palmitates.

In one embodiment, the abovementioned amounts are with respect to the amount of elastomer present in the organic medium.

In one embodiment the aqueous medium therefore comprises 20.000 ppm or less, preferably 10.000 ppm or less, more preferably 8.000 ppm or less, even more preferably 5.000 ppm or less and yet even more preferably 2.000 ppm or less and in another yet even more preferred embodiment 1.000 ppm or less of non-LCST compounds whereby the non-LCST compounds are selected from the five groups described above.

In one embodiment, the abovementioned amounts are with respect to the amount of elastomer present in the organic medium.

In another embodiment the aqueous medium comprises 500 ppm or less, preferably 100 ppm or less, more preferably 50 ppm or less, even more preferably 30 ppm or less and yet even more preferably 10 ppm or less and in another yet even more preferred embodiment 1.000 ppm or less of non-LCST compounds whereby the non-LCST compounds are selected from the five groups described above.

In one embodiment, the abovementioned amounts are with respect to the amount of elastomer present in the organic medium.

If not expressly stated otherwise ppm refers to parts per million by weight.

In one embodiment the aqueous medium comprises of from 0 to 5,000 ppm, preferably of from 0 to 2,000 ppm, more preferably of from 10 to 1,000 ppm, even more preferably of from 50 to 800 ppm and yet even more preferably of from 100 to 600 ppm of salts of mono or multivalent metal ions calculated on their metal content and with respect to the amount of elastomer present in the organic medium.

In another embodiment the aqueous medium comprises of from 0 to 5,000 ppm, preferably of from 0 to 2,000 ppm, more preferably of from 10 to 1,000 ppm, even more preferably of from 50 to 800 ppm and yet even more preferably of from 100 to 600 ppm of salts of multivalent metal ions calculated on their metal content and with respect to the amount of elastomer present in the organic medium.

In another embodiment the weight ratio of salts of stearates, palmitates and oleates of mono- and multivalent metal ions, if present, to the LCST compounds is of from 1:2 to 1:100, preferably 1:2 to 1:10 and more preferably of from 1:5 to 1:10 in the aqueous medium.

In one embodiment the aqueous medium comprises 550 ppm or less, preferably 400 ppm or less, more preferably 300 ppm or less, even more preferably 250 ppm or less and yet even more preferably 150 ppm or less and in another yet even more preferred embodiment 100 ppm or less of salts of metal ions calculated on their metal content and with respect to the amount of elastomer present in the organic medium.

In yet another embodiment the aqueous medium comprises 550 ppm or less, preferably 400 ppm or less, more preferably 300 ppm or less, even more preferably 250 ppm or less and yet even more preferably 150 ppm or less and in another yet even more preferred embodiment 100 ppm or less of salts of multivalent metal ions calculated on their metal content and with respect to the amount of elastomer present in the organic medium.

In one embodiment, the aqueous medium comprises 8.000 ppm or less, preferably 5.000 ppm or less, more preferably 2.000 ppm or less, yet even more preferably 1.000 ppm or less, in another embodiment preferably 500 ppm or less, more preferably 100 ppm or less and even more preferably 15 ppm or less and yet even more preferably no or from 1 ppm to 10 ppm of non-ionic surfactants being non-LCST compounds whereby the non-LCST compounds are selected from the five groups described above and with respect to the amount of elastomer present in the organic medium.

As used herein a LCST compound is a compound which is soluble in a liquid medium at a lower temperature but precipitates from the liquid medium above a certain temperature, the so called lower critical solution temperature or LCST temperature. This process is reversible, so the system becomes homogeneous again on cooling down. The temperature at which the solution clarifies on cooling down is known as the cloud point (see German standard specification DIN EN 1890 of September 2006). This temperature is characteristic for a particular substance and a particular method.

Depending on the nature of the LCST compound which typically comprises hydrophilic and hydrophobic groups the determination of the cloud point may require different conditions as set forth in DIN EN 1890 of September 2006. Even though this DIN was originally developed for non-ionic surface active agents obtained by condensation of ethylene oxide this method allows determination of cloud points for a broad variety of LCST compounds as well. However, adapted conditions were found helpful to more easily determine cloud points for structurally different compounds.

Therefore the term LCST compound as used herein covers all compounds where a cloud point of 0 to 100° C., preferably 5 to 100° C., more preferably 15 to 80° C. and even more preferably 20 to 80° C. can be determined by at least one of the following methods:
1) DIN EN 1890 of September 2006, method A
2) DIN EN 1890 of September 2006, method C
3) DIN EN 1890 of September 2006, method E
4) DIN EN 1890 of September 2006, method A wherein the amount of compound tested is reduced from 1 g per 100 ml of distilled water to 0.05 g per 100 ml of distilled water.

5) DIN EN 1890 of September 2006, method A wherein the amount of compound tested is reduced from 1 g per 100 ml of distilled water to 0.2 g per 100 ml of distilled water.

In another embodiment the cloud points indicated above can be determined by at least one of the methods 1), 2) or 4).

In a preferred embodiment the LCST compounds are those which cloud points can be determined by at least one of the methods 1), 3) or 4).

As a consequence, non-LCST compounds are in general those compounds having either no cloud point or a cloud point outside the scope as defined hereinabove. It is apparent to those skilled in the art and known from various commercially available products, that the different methods described above may lead to slightly different cloud points. However, the measurements for each method are consistent and reproducible within their inherent limits of error and the general principle of the invention is not affected by different LCST temperatures determined for the same compound as long as with at least one of the above methods the cloud point is found to be within the ranges set forth above.

For the sake of clarity it should be mentioned that metal ions, in particular multivalent metal ions such as aluminum already stemming from the initiator system employed in step b) are not encompassed by the calculation of metal ions present in the aqueous phase employed in step A).

In another embodiment, the aqueous medium comprises 70 ppm or less, preferably 50 ppm or less, more preferably 30 ppm or less and even more preferably 20 ppm or less and yet even more preferably 10 ppm or less of salts of multivalent metal ions calculated on their metal content and with respect to the amount of elastomer present in the organic medium.

In yet another embodiment, the aqueous medium comprises 25 ppm or less, preferably 10 ppm or less, more preferably 8 ppm or less and even more preferably 7 ppm or less and yet even more preferably 5 ppm or less of salts of multivalent metal ions calculated on their metal content and with respect to the amount of elastomer present in the organic medium.

In another embodiment, the aqueous medium comprises 550 ppm or less, preferably 400 ppm or less, more preferably 300 ppm or less, even more preferably 250 ppm or less and yet even more preferably 150 ppm or less and in another yet even more preferred embodiment 100 ppm or less of carboxylic acid salts of multivalent metal ions calculated on their metal content and with respect to the amount of elastomer present in the organic medium, whereby the carboxylic acids are selected from those having 6 to 30 carbon atoms, preferably 8 to 24 carbon atoms, more preferably 12 to 18 carbon atoms. In one embodiment such carboxylic acids are selected from monocarboxylic acids. In another embodiment such carboxylic acids are selected from saturated monocarboxylic acids such as stearic acid.

The following example shows how the calculation is performed.

The molecular weight of calcium stearate ($C_{36}H_{70}CaO_4$) is 607.04 g/mol. The atomic weight of calcium metal is 40.08 g/mol. In order to provide e.g. 1 kg of an aqueous medium comprising 550 ppm of a salts of a multivalent metal ion (calcium stearate) calculated on its metal content (calcium) and with respect to the amount of elastomer present in the organic medium that is sufficient to form a slurry from a organic medium comprising 10 g of a elastomer the aqueous medium must comprise (607.04/40.08)× (550 ppm of 10 g)=83 mg of calcium stearate or 0.83 wt.-% with respect to the elastomer or 83 ppm with respect to the aqueous medium. The weight ratio of aqueous medium to elastomer present in the organic medium would in this case be 100:1.

In yet another embodiment, the aqueous medium comprises 70 ppm or less, preferably 50 ppm or less, more preferably 30 ppm or less and even more preferably 20 ppm or less and yet even more preferably 10 ppm or less of carboxylic acid salts of multivalent metal ions calculated on their metal content and with respect to the amount of elastomer present in the organic medium, whereby the carboxylic acids are selected from those having 6 to 30 carbon atoms, preferably 8 to 24 carbon atoms, more preferably 12 to 18 carbon atoms. In one embodiment such carboxylic acids are selected from monocarboxylic acids. In another embodiment such carboxylic acids are selected from saturated monocarboxylic acids such as palmitic acid or stearic acid.

In yet another embodiment, the aqueous medium comprises 25 ppm or less, preferably 10 ppm or less, more preferably 8 ppm or less and even more preferably 7 ppm or less and yet even more preferably 5 ppm or less of carboxylic acid salts of multivalent metal ions calculated on their metal content and with respect to the amount of elastomer present in the organic medium, whereby the carboxylic acids are selected from those having 6 to 30 carbon atoms, preferably 8 to 24 carbon atoms, more preferably 12 to 18 carbon atoms. In one embodiment such carboxylic acids are selected from monocarboxylic acids. In another embodiment such carboxylic acids are selected from saturated monocarboxylic acids such as stearic acid.

In one embodiment the aqueous medium is free of carboxylic acid salts of multivalent metal ions whereby the carboxylic acids are selected from those having 6 to 30 carbon atoms, preferably 8 to 24 carbon atoms, more preferably 12 to 18 carbon atoms. In one embodiment such carboxylic acids are selected from monocarboxylic acids. In another embodiment such carboxylic acids are selected from saturated monocarboxylic acids such as stearic acid.

In another embodiment, the aqueous medium comprises 100 ppm or less, preferably 50 ppm or less, more preferably 20 ppm or less and even more preferably 15 ppm or less and yet even more preferably 10 ppm or less of salts of monovalent metal ions calculated on their metal content and with respect to the amount of elastomer present in the organic medium.

In another embodiment, the aqueous medium comprises additionally or alternatively 100 ppm or less, preferably 50 ppm or less, more preferably 30 ppm or less, even more preferably 20 ppm or less and yet even more preferably 10 ppm or less and in another yet even more preferred embodiment 5 ppm or less of carboxylic acid salts of monovalent metal ions such as sodium stearate, sodium palmitate and sodium oleate and potassium stearate, potassium palmitate and potassium oleate calculated on their metal content and with respect to the amount of elastomer present in the organic medium, whereby the carboxylic acids are selected from those having 6 to 30 carbon atoms, preferably 8 to 24 carbon atoms, more preferably 12 to 18 carbon atoms. In one embodiment such carboxylic acids are selected from monocarboxylic acids. In another embodiment such carboxylic acids are selected from saturated monocarboxylic acids such as stearic acid. Examples of monovalent salts of carboxylic acids include sodium stearate, palmitate and oleate as well as potassium stearate, palmitate and oleate.

In one embodiment the aqueous medium is free of carboxylic acid salts of monovalent metal ions whereby the carboxylic acids are selected from those having 6 to 30 carbon atoms, preferably 8 to 24 carbon atoms, more preferably 12 to 18 carbon atoms. In one embodiment such carboxylic acids are selected from monocarboxylic acids. In another embodiment such carboxylic acids are selected from saturated monocarboxylic acids such as palmitic or stearic acid.

In another embodiment the aqueous medium comprises of from 0 to 5,000 ppm, preferably of from 0 to 2,000 ppm, more preferably of from 10 to 1,000 ppm, even more preferably of from 50 to 800 ppm and yet even more preferably of from 100 to 600 ppm of carbonates of multivalent metal ions calculated on their metal content and with respect to the amount of elastomer present in the organic medium.

In another embodiment, the aqueous medium comprises 550 ppm or less, preferably 400 ppm or less, more preferably 300 ppm or less, even more preferably 250 ppm or less and yet even more preferably 150 ppm or less and in another yet even more preferred embodiment 100 ppm or less of
  carbonates of multivalent metal ions calculated on their metal content and with respect to the amount of elastomer present in the organic medium or in another embodiment of
  magnesium carbonate and calcium carbonate calculated on their metal content and with respect to the amount of elastomer present in the organic medium.

In yet another embodiment, the aqueous medium comprises 70 ppm or less, preferably 50 ppm or less, more preferably 30 ppm or less and even more preferably 20 ppm or less and yet even more preferably 10 ppm or less of
  carbonates of multivalent metal ions calculated on their metal content and with respect to the amount of elastomer present in the organic medium or in another embodiment of
  magnesium carbonate and calcium carbonate calculated on their metal content and with respect to the amount of elastomer present in the organic medium.

Carbonates of multivalent metal ions are in particular magnesium carbonate and calcium carbonate.

The term multivalent metal ions encompasses in particular bivalent earth alkaline metal ions such as magnesium, calcium, strontium and barium, preferably magnesium and calcium, trivalent metal ions of group 13 such as aluminium, multivalent metal ions of groups 3 to 12 in particular the bivalent metal ion of zinc.

The term monovalent metal ions encompasses in particular alkaline metal ions such as lithium, sodium and potassium.

In another embodiment, the aqueous medium comprises 500 ppm or less, preferably 200 ppm or less, more preferably 100 ppm or less, even more preferably 50 ppm or less and yet even more preferably 20 ppm or less and in another yet even more preferred embodiment no layered minerals such as talcum calculated with respect to the amount of elastomer present in the organic medium.

In another embodiment, the aqueous medium comprises 500 ppm or less, preferably 200 ppm or less, more preferably 100 ppm or less, even more preferably 20 ppm or less and yet even more preferably 10 ppm or less and in another yet even more preferred embodiment 5 ppm or less and yet even more preferably no dispersants, emulsifiers or anti-agglomerants other than the LCST compounds.

The term □plurality□ denotes an integer of at least two, preferably at least 20, more preferably at least 100.

In one embodiment the expression □aqueous slurry comprising a plurality of elastomer particles suspended therein□denotes a slurry having at least 10 discrete particles per liter suspended therein, preferably at least 20 discrete particles per liter, more preferably at least 50 discrete particles per liter and even more preferably at least 100 discrete particles per liter.

The term elastomer particles denote discrete particles of any form and consistency, which in a preferred embodiment have a particle size of between 0.05 mm and 25 mm, more preferably between 0.1 and 20 mm.

In one embodiment the weight average particle size of the rubber particles is from 0.3 to 10.0 mm.

It is apparent to those skilled in the art, that the elastomer particles formed according to the invention may still contain organic diluent and/or residual monomers and further may contain water encapsulated within the elastomer particle. In one embodiment the elastomer particles contain 90 wt.-% or more of the elastomer calculated on the sum of organic diluent, monomers and elastomer, preferably 93 wt.-% or more, more preferably 94 wt.-% or more and even more preferably 96 wt.-% or more.

As mentioned above elastomer particles are often referred to as crumbs in the literature. Typically the elastomer particles or crumbs have non-uniform shape and/or geometry.

The term aqueous medium denotes a medium comprising 80 wt.-% or more of water, preferably 90 wt.-% or more 80 wt.-% and even more preferably 95 wt.-% or more of water and yet even more preferably 99 wt.-% or more.

The remainder to 100 wt.-% includes the LCST compounds and may further include compounds selected from the group of
  non-LCST compounds as defined above
  compounds and salts which are neither an LCST compound nor a non-LCST compound as defined above
  organic diluents to the extent dissolvable in the aqueous medium
  where an extended shelf life of the product is desired antioxidants and/or stabilizers.

In one embodiment the aqueous medium comprises of from 1 to 2,000 ppm of antioxidants, preferably of from 50 to 1,000 ppm more preferably of from 80 to 500 ppm calculated with respect to the amount of elastomer present in the organic medium.

Where desired to obtain very high purity products the water employed to prepare the aqueous phase is demineralized by standard procedure such as ion-exchange, membrane filtration techniques such as reverse osmosis and the like.

Typically application of water having a degree of 8.0 german degrees of hardness (□dH) hardness or less, preferably 6.0□dH or less, more preferably 3.75□dH or less and even more preferably 3.00□dH or less is sufficient.

In one embodiment the water is mixed with the at least one LCST compounds to obtain a concentrate which is depending on the temperature either a slurry or a solution having a LCST-compound concentration of from 0.1 to 2 wt.-%, preferably 0.5 to 1 wt.-%. This concentrate is then metered into and diluted with more water in the vessel in which step A) is performed to the desired concentration.

Preferably the concentrate is a solution and metered into the vessel having a temperature of from 0 to 35° C., preferably 10 to 30° C.

If not mentioned otherwise, ppm refer to weight.-ppm.

The aqueous medium may further contain antioxidants and stabilizers:

Antioxidants and stabilizers include 2,6-di-tert.-butyl-4-methyl-phenol (BHT) and pentaerythrol-tetrakis-[3-(3,5-di-tert.-butyl-4-hydroxyphenyl)-propanoic acid (also known as Irganox□ 1010), octadecyl 3,5-di(tert)-butyl-4-hydroxyhydrocinnamate (also known as Irganox□ 1076), tert-butyl-4-hydroxy anisole (BHA), 2-(1,1-dimethyl)-1,4-benzenediol (TBHQ), tris(2,4,-di-tert-butylphenyl)phosphate (Irgafos□ 168), dioctyldiphenylamine (Stalite□ S), butylated products of p-cresol and dicyclopentadiene (Wingstay) as well as other phenolic antioxidants and hindered amine light stabilizers.

Suitable antioxidants generally include 2,4,6-tri-tert-butylphenol, 2,4,6 tri-isobutylphenol, 2-tert-butyl-4,6-dimethylphenol, 2,4-dibutyl-6-ethylphenol, 2,4-dimethyl-6-tert-butylphenol, 2,6-di-tert-butylhydroyxytoluol (BHT), 2,6-di-tert-butyl-4-ethylphenol, 2,6-di-tert-butyl-4-n-butylphenol, 2,6-di-tert-butyl-4-iso-butylphenol, 2,6-dicyclopentyl-4-methylphenol, 4-tert-butyl-2,6-dimethylphenol, 4-tert-butyl-2,6-dicyclopentylphenol, 4-tert-butyl-2,6-diisopropylphenol, 4,6-di-tert-butyl-2-methylphenol, 6-tert-butyl-2,4-dimethylphenol, 2,6-di-tert-butyl-3-methylphenol, 4-hydroxymethyl-2,6-di-tert-butylphenol, 2,6-di-tert-butyl-4-phenylphenol and 2,6-dioctadecyl-4-methylphenol, 2,2□ethylidene-bis[4,6-di-tert.-butylphenol], 2,2□ethylidene-bis[6-tert.-butyl-4-isobutylphenol], 2,2□isobutylidene-bis[4,6-dimethyl-phenol], 2,2□methylene-bis[4,6-di-tert.-butylphenol], 2,2□methylene-bis[4-methyl-6-(α-methylcyclohexyl)phenol], 2,2□methylene-bis[4-methyl-6-cyclohexylphenol], 2,2□methylene-bis[4-methyl-6-nonylphenol], 2,2□methylene-bis[6-(α, α□dimethylbenzyl)-4-nonylphenol], 2,2□methylene-bis[6-(α-methylbenzyl)-4-nonylphenol], 2,2□methylene-bis[6-cyclohexyl-4-methylphenol], 2,2□methylene-bis[6-tert.-butyl-4-ethylphenol], 2,2□methylene-bis[6-tert.-butyl-4-methylphenol], 4,4□butylidene-bis[2-tert.-butyl-5-methylphenol], 4,4□methylene-bis[2,6-di-tert.-butylphenol], 4,4□methylene-bis[6-tert.-butyl-2-methylphenol], 4,4□isopropylidene-diphenol, 4,4'-decylidene-bisphenol, 4,4'-dodecylidene-bisphenol, 4,4□(1-methyloctylidene)bisphenol, 4,4□cyclohexylidene-bis (2-methylphenol), 4,4□cyclohexylidenebisphenol, and pentaerythrol-tetrakis-[3-(3,5-di-tert.-butyl-4-hydroxyphenyl)-propanoic acid (also known as Irganox□ 1010).

In one embodiment the weight average molecular weight of the elastomer is in the range of from 10 to 2,000 kg/mol, preferably in the range of from 20 to 1,000 kg/mol, more preferably in the range of from 50 to 1,000 kg/mol, even more preferably in the range of from 200 to 800 kg/mol, yet more preferably in the range of from 375 to 550 kg/mol, and most preferably in the range of from 400 to 500 kg/mol. Molecular weights are obtained using gel permeation chromatography in tetrahydrofuran (THF) solution using polystyrene molecular weight standards if not mentioned otherwise.

In one embodiment the polydispersity of the elastomers according to the invention is in the range of 1.5 to 4.5 as measured by the ratio of weight average molecular weight to number average molecular weight as determined by gel permeation chromatography.

The elastomer for example and typically has a Mooney viscosity of at least 10 (ML 1+8 at 125° C., ASTM D 1646), preferably of from 10 to 80, more preferably of from 20 to 80 and even more preferably of from 25 to 60 (ML 1+8 at 125° C., ASTM D 1646).

Monomers

In one embodiment the organic medium employed in step A) is obtained by a process comprising at least the steps of:
a) providing a reaction medium comprising an organic diluent, and at least one polymerizable monomer
b) polymerizing the monomers within the reaction medium in the presence of an initiator system or catalyst to form an organic medium comprising the elastomer, the organic diluent and optionally residual monomers In one preferred embodiment the organic medium is obtained by a process comprising at least the steps of:
a) providing a reaction medium comprising an organic diluent, and at least two monomers whereby at least one monomer is an isoolefin and at least one monomer is a multiolefin;
b) polymerizing the monomers within the reaction medium in the presence of an initiator system to form an organic medium comprising the elastomer, the organic diluent and optionally residual monomers In this embodiment in step a) a reaction medium comprising an organic diluent, and at least two monomers is provided whereby at least one monomer is an isoolefin and at least one monomer is a multiolefin.

As used herein the term isoolefins denotes compounds comprising one carbon-carbon-double-bond, wherein one carbon-atom of the double-bond is substituted by two alkyl-groups and the other carbon atom is substituted by two hydrogen atoms or by one hydrogen atom and one alkyl-group.

Examples of suitable isoolefins include isoolefin monomers having from 4 to 16 carbon atoms, preferably 4 to 7 carbon atoms, such as isobutene, 2-methyl-1-butene, 3-methyl-1-butene, 2-methyl-2-butene. A preferred isoolefin is isobutene.

As used herein the term multiolefin denotes compounds comprising more than one carbon-carbon-double-bond, either conjugated or non-conjugated.

Examples of suitable multiolefins include isoprene, butadiene, 2-methylbutadiene, 2,4-dimethylbutadiene, piperyline, 3-methyl-1,3-pentadiene, 2,4-hexadiene, 2-neopentylbutadiene, 2-methyl-1,5-hexadiene, 2,5-dimethyl-2,4-hexadiene, 2-methyl-1,4-pentadiene, 4-butyl-1,3-pentadiene, 2,3-dimethyl-1,3-pentadiene, 2,3-dibutyl-1,3-pentadiene, 2-ethyl-1,3-pentadiene, 2-ethyl-1,3-butadiene, 2-methyl-1,6-heptadiene, cyclopentadiene, methylcyclopentadiene, cyclohexadiene and 1-vinyl-cyclohexadiene.

Preferred multiolefins are isoprene and butadiene. Isoprene is particularly preferred.

The elastomers may further comprise further olefins which are neither isoolefins nor multiolefins.

Examples of such suitable olefins include β-pinene, styrene, divinylbenzene, diisopropenylbenzene o-, m- and p-alkylstyrenes such as o-, m- and p-methyl-styrene.

In one embodiment, the monomers employed in step a) may comprise in the range of from 80 wt.-% to 99.5 wt.-%, preferably of from 85 wt.-% to 98.0 wt.-%, more preferably of from 85 wt.-% to 96.5 wt.-%, even more preferably of from 85 wt.-% to 95.0 wt.-%, by weight of at least one isoolefin monomer and in the range of from 0.5 wt.-% to 20 wt.-%, preferably of from 2.0 wt.-% to 15 wt.-%, more preferably of from 3.5 wt.-% to 15 wt.-%, and yet even more preferably of from 5.0 wt.-% to 15 wt.-% by weight of at least one multiolefin monomer based on the weight sum of all monomers employed.

In another embodiment the monomer mixture comprises in the range of from 90 wt.-% to 95 wt.-% of at least one isoolefin monomer and in the range of from 5 wt.-% to 10 wt.-% by weight of a multiolefin monomer based on the weight sum of all monomers employed. Yet more preferably, the monomer mixture comprises in the range of from 92 wt.-% to 94 wt.-% of at least one isoolefin monomer and in the range of from 6 wt.-% to 8 wt.-% by weight of at least one multiolefin monomer based on the weight sum of all monomers employed. The isoolefin is preferably isobutene and the multiolefin is preferably isoprene.

The multiolefin content of elastomers produced according to the invention is typically 0.1 mol-% or more, preferably of from 0.1 mol-% to 15 mol-%, in another embodiment 0.5 mol-% or more, preferably of from 0.5 mol-% to 10 mol-%, in another embodiment 0.7 mol-% or more, preferably of from 0.7 to 8.5 mol-% in particular of from 0.8 to 1.5 or from 1.5 to 2.5 mol-% or of from 2.5 to 4.5 mol-% or from 4.5 to 8.5 mol-%, particularly where isobutene and isoprene are employed.

In another embodiment the multiolefin content of elastomers produced according to the invention is 0.001 mol-% or more, preferably of from 0.001 mol-% to 3 mol-%, particularly where isobutene and isoprene are employed.

The monomers may be present in the reaction medium in an amount of from 0.01 wt.-% to 80 wt.-%, preferably of from 0.1 wt.-% to 65 wt.-%, more preferably of from 10.0 wt.-% to 65.0 wt.-% and even more preferably of from 25.0 wt.-% to 65.0 wt.-% or in another embodiment of from 10.0 wt.-% to 40.0 wt.-%.

In one embodiment the monomers are purified before use in step a), in particular when they are recycled from step d). Purification of monomers may be carried out by passing through adsorbent columns comprising suitable molecular sieves or alumina based adsorbent materials. In order to minimize interference with the polymerization reaction, the total concentration of water and substances such as alcohols and other organic oxygenates that act as poisons to the reaction are preferably reduced to less than around 10 parts per million on a weight basis.

Organic Diluents

The term organic diluent encompasses diluting or dissolving organic chemicals which are liquid under reactions conditions. Any suitable organic diluent may be used which does not or not to any appreciable extent react with monomers or components of the initiator system.

However, those skilled in the art are aware that interactions between the diluent and monomers or components of the initiator system or the catalyst may occur.

Additionally, the term organic diluent includes mixtures of at least two diluents.

Examples of organic diluents include hydrochlorocarbon(s) such as methyl chloride, methylene chloride or ethyl chloride.

Further examples of organic diluents include hydrofluorocarbons represented by the formula: $C_xH_yF_z$ wherein x is an integer from 1 to 40, alternatively from 1 to 30, alternatively from 1 to 20, alternatively from 1 to 10, alternatively from 1 to 6, alternatively from 2 to 20 alternatively from 3 to 10, alternatively from 3 to 6, most preferably from 1 to 3, wherein y and z are integers and at least one.

In one embodiment the hydrofluorocarbon(s) is/are selected from the group consisting of saturated hydrofluorocarbons such as fluoromethane; difluoromethane; trifluoromethane; fluoroethane; 1,1-difluoroethane; 1,2-difluoroethane; 1,1,1-trifluoroethane; 1,1-,2-trifluoroethane; 1,1,2,2-tetrafluoroethane; 1,1,1,2,2-pentafluoroethane; 1-fluoropropane; 2-fluoropropane; 1,1-difluoropropane; 1,2-difluoropropane; 1,3-difluoropropane; 2,2-difluoropropane; 1,1,1-trifluoropropane; 1,1,2-trifluoropropane; 1,1,3-trifluoropropane; 1,2,2-trifluoropropane; 1,2,3-trifluoropropane; 1,1,1,2-tetrafluoropropane; 1,1,1,3-tetrafluoropropane; 1,1,2,2-tetrafluoropropane; 1,1,2,3-tetrafluoropropane; 1,1,3,3-tetrafluoropropane; 1,2,2,3-tetrafluoropropane; 1,1,1,2,2-pentafluoropropane; 1,1,1,2,3-pentafluoropropane; 1,1,1,3,3-pentafluoropropane; 1,1,2,2,3-pentafluoropropane; 1,1,2,3,3-pentafluoropropane; 1,1,1,2,2,3-hexafluoropropane; 1,1,1,2,3,3-hexafluoropropane; 1,1,1,3,3,3-hexafluoropropane; 1,1,1,2,2,3,3-heptafluoropropane; 1,1,1,2,3,3,3-heptafluoropropane; 1-fluorobutane; 2-fluorobutane; 1,1-difluorobutane; 1,2-difluorobutane; 1,3-difluorobutane; 1,4-difluorobutane; 2,2-difluorobutane; 2,3-difluorobutane; 1,1,1-trifluorobutane; 1,1,2-trifluorobutane; 1,1,3-trifluorobutane; 1,1,4-trifluorobutane; 1,2,2-trifluorobutane; 1,2,3-trifluorobutane; 1,3,3-trifluorobutane; 2,2,3-trifluorobutane; 1,1,1,2-tetrafluorobutane; 1,1,1,3-tetrafluorobutane; 1,1,1,4-tetrafluorobutane; 1,1,2,2-tetrafluorobutane; 1,1,2,3-tetrafluorobutane; 1,1,2,4-tetrafluorobutane; 1,1,3,3-tetrafluorobutane; 1,1,3,4-tetrafluorobutane; 1,1,4,4-tetrafluorobutane; 1,2,2,3-tetrafluorobutane; 1,2,2,4-tetrafluorobutane; 1,2,3,3-tetrafluorobutane; 1,2,3,4-tetrafluorobutane; 2,2,3,3-tetrafluorobutane; 1,1,1,2,2-pentafluorobutane; 1,1,1,2,3-pentafluorobutane; 1,1,1,2,4-pentafluorobutane; 1,1,1,3,3-pentafluorobutane; 1,1,1,3,4-pentafluorobutane; 1,1,1,4,4-pentafluorobutane; 1,1,2,2,3-pentafluorobutane; 1,1,2,2,4-pentafluorobutane; 1,1,2,3,3-pentafluorobutane; 1,1,2,4,4-pentafluorobutane; 1,1,3,3,4-pentafluorobutane; 1,2,2,3,3-pentafluorobutane; 1,2,2,3,4-pentafluorobutane; 1,1,1,2,2,3-hexafluorobutane; 1,1,1,2,2,4-hexafluorobutane; 1,1,1,2,3,3-hexafluorobutane; 1,1,1,2,3,4-hexafluorobutane; 1,1,1,2,4,4-hexafluorobutane; 1,1,1,3,3,4-hexafluorobutane; 1,1,1,3,4,4-hexafluorobutane; 1,1,1,4,4,4-hexafluorobutane; 1,1,2,2,3,3-hexafluorobutane; 1,1,2,2,3,4-hexafluorobutane; 1,1,2,2,4,4-hexafluorobutane; 1,1,2,3,3,4-hexafluorobutane; 1,1,2,3,4,4-hexafluorobutane; 1,2,2,3,3,4-hexafluorobutane; 1,1,1,2,2,3,3-heptafluorobutane; 1,1,1,2,2,4,4-heptafluorobutane; 1,1,1,2,2,3,4-heptafluorobutane; 1,1,1,2,3,3,4-heptafluorobutane; 1,1,1,2,3,4,4-heptafluorobutane; 1,1,1,2,4,4,4-heptafluorobutane; 1,1,1,3,3,4,4-heptafluorobutane; 1,1,1,2,2,3,3,4-octafluorobutane; 1,1,1,2,2,3,4,4-octafluorobutane; 1,1,1,2,3,3,4,4-octafluorobutane; 1,1,1,2,2,4,4,4-octafluorobutane; 1,1,1,2,3,4,4,4-octafluorobutane; 1,1,1,2,2,3,3,4,4-nonafluorobutane; 1,1,1,2,2,3,4,4,4-nonafluorobutane; 1-fluoro-2-methylpropane; 1,1-difluoro-2-methylpropane; 1,3-difluoro-2-methylpropane; 1,1,1-trifluoro-2-methylpropane; 1,1,3-trifluoro-2-methylpropane; 1,3-difluoro-2-(fluoromethyl)propane; 1,1,1,3-tetrafluoro-2-methylpropane; 1,1,3,3-tetrafluoro-2-methylpropane; 1,1,3-trifluoro-2-(fluoromethyl)propane; 1,1,1,3,3-pentafluoro-2-methylpropane; 1,1,3,3-tetrafluoro-2-(fluoromethyl)propane; 1,1,1,3-tetrafluoro-2-(fluoromethyl)propane; fluorocyclobutane; 1,1-difluorocyclobutane; 1,2-difluorocyclobutane; 1,3-difluorocyclobutane; 1,1,2-trifluorocyclobutane; 1,1,3-trifluorocyclobutane; 1,2,3-trifluorocyclobutane; 1,1,2,2-tetrafluorocyclobutane; 1,1,3,3-tetrafluorocyclobutane; 1,1,2,2,3-pentafluorocyclobutane; 1,1,2,3,3-pentafluorocyclobutane; 1,1,2,2,3,3-hexafluorocyclobutane; 1,1,2,2,3,4-hexafluorocyclobutane; 1,1,2,3,3,4-hexafluorocyclobutane; 1,1,2,2,3,3,4-heptafluorocyclobutane;

Particularly preferred HFC's include difluoromethane, trifluoromethane, 1,1-difluoroethane, 1,1,1-trifluoroethane, fluoromethane, and 1,1,1,2-tetrafluoroethane.

In one further embodiment the hydrofluorocarbon(s) is/are selected from the group consisting of unsaturated hydrofluorocarbons such as vinyl fluoride; 1,2-difluoroethene; 1,1,2-trifluoroethene; 1-fluoropropene, 1,1-difluoropropene; 1,2-difluoropropene; 1,3-difluoropropene; 2,3-difluoropropene; 3,3-difluoropropene; 1,1,2-trifluoropropene; 1,1,3-trifluoropropene; 1,2,3-trifluoropropene; 1,3,3-trifluoropropene; 2,3,3-trifluoropropene; 3,3,3-trifluoropropene; 2,3,3,3-tetrafluoro-1-propene; 1-fluoro-1- butene; 2-fluoro-1-butene; 3-fluoro-1-butene; 4-fluoro-1-butene; 1,1-difluoro-1-butene; 1,2-difluoro-1-butene; 1,3-difluoropropene; 1,4-difluoro-1-butene; 2,3-difluoro-1-butene; 2,4-difluoro-1-butene; 3,3-difluoro-1-butene; 3,4-difluoro-1-butene; 4,4-difluoro-1-butene; 1,1,2-trifluoro-1-butene; 1,1,3-trifluoro-1-butene; 1,1,4-trifluoro-1-butene; 1,2,3-trifluoro-1-butene; 1,2,4-trifluoro-1-butene; 1,3,3-trifluoro-1-butene; 1,3,4-trifluoro-1-butene; 1,4,4-trifluoro-1-butene; 2,3,3-trifluoro-1-butene; 2,3,4-trifluoro-1-butene; 2,4,4-trifluoro-1-butene; 3,3,4-trifluoro-1-butene; 3,4,4-trifluoro-1-butene; 4,4,4-trifluoro-1-butene; 1,1,2,3-tetrafluoro-1-butene; 1,1,2,4-tetrafluoro-1-butene; 1,1,3,3-tetrafluoro-1-butene; 1,1,3,4-tetrafluoro-1-butene; 1,1,4,4-tetrafluoro-1-butene; 1,2,3,3-tetrafluoro-1-butene; 1,2,3,4-tetrafluoro-1-butene; 1,2,4,4-tetrafluoro-1-butene; 1,3,3,4-tetrafluoro-1-butene; 1,3,4,4-tetrafluoro-1-butene; 1,4,4,4-tetrafluoro-1-butene; 2,3,3,4-tetrafluoro-1-butene; 2,3,4,4-tetrafluoro-1-butene; 2,4,4,4-tetrafluoro-1-butene; 3,3,4,4-tetrafluoro-1-butene; 3,4,4,4-tetrafluoro-1-butene; 1,1,2,3,3-pentafluoro-1-butene; 1,1,2,3,4-pentafluoro-1-butene; 1,1,2,4,4-pentafluoro-1-butene; 1,1,3,3,4-pentafluoro-1-butene; 1,1,3,4,4-pentafluoro-1-butene; 1,1,4,4,4-pentafluoro-1-butene; 1,2,3,3,4-pentafluoro-1-butene; 1,2,3,4,4-pentafluoro-1-butene; 1,2,4,4,4-pentafluoro-1-butene; 2,3,3,4,4-pentafluoro-1-butene; 2,3,4,4,4-pentafluoro-1-butene; 3,3,4,4,4-pentafluoro-1-butene; 1,1,2,3,3,4-hexafluoro-1-butene; 1,1,2,3,4,4-hexafluoro-1-butene; 1,1,2,4,4,4-hexafluoro-1-butene; 1,2,3,3,4,4-bexafluoro-1-butene; 1,2,3,4,4,4-hexafluoro-1-butene; 2,3,3,4,4,4-hexafluoro-1-butene; 1,1,2,3,3,4,4-heptafluoro-1-butene; 1,1,2,3,4,4,4-heptafluoro-1-butene; 1,1,3,3,4,4,4-heptafluoro-1-butene; 1,2,3,3,4,4,4-heptafluoro-1-butene; 1-fluoro-2-butene; 2-fluoro-2-butene; 1,1-difluoro-2-butene; 1,2-difluoro-2-butene; 1,3-difluoro-2-butene; 1,4-difluoro-2-butene; 2,3-difluoro-2-butene; 1,1,1-trifluoro-2-butene; 1,1,2-trifluoro-2-butene; 1,1,3-trifluoro-2-butene; 1,1,4-trifluoro-2-butene; 1,2,3-trifluoro-2-butene; 1,2,4-trifluoro-2-butene; 1,1,1,2-tetrafluoro-2-butene; 1,1,1,3-tetrafluoro-2-butene; 1,1,1,4-tetrafluoro-2-butene; 1,1,2,3-tetrafluoro-2-butene; 1,1,2,4-tetrafluoro-2-butene; 1,2,3,4-tetrafluoro-2-butene; 1,1,1,2,3-pentafluoro-2-butene; 1,1,1,2,4-pentafluoro-2-butene; 1,1,1,3,4-pentafluoro-2-butene; 1,1,1,4,4-pentafluoro-2-butene; 1,1,2,3,4-pentafluoro-2-butene; 1,1,2,4,4-pentafluoro-2-butene; 1,1,1,2,3,4-hexafluoro-2-butene; 1,1,1,2,4,4-hexafluoro-2-butene; 1,1,1,3,4,4-hexafluoro-2-butene; 1,1,1,4,4,4-hexafluoro-2-butene; 1,1,2,3,4,4-hexafluoro-2-butene; 1,1,2,3,4,4-heptafluoro-2-butene; 1,1,1,2,4,4,4-heptafluoro-2-butene; and mixtures thereof.

Further examples of organic diluents include hydrochlorofluorocarbons.

Further examples of organic diluents include hydrocarbons, preferably alkanes which in a further preferred embodiment are those selected from the group consisting of propane, isobutane, pentane, methylcyclopentane, isohexane, 2-methylpentane, 3-methylpentane, 2-methylbutane, 2,2-dimethylbutane, 2,3-dimethylbutane, 2-methylhexane, 3-methylhexane, 3-ethylpentane, 2,2-dimethylpentane, 2,3-dimethylpentane, 2,4-dimethylpentane, 3,3-dimethyl pentane, 2-methylheptane, 3-ethylhexane, 2,5-dimethylhexane, 2,2,4,-trimethylpentane, octane, heptane, butane, ethane, methane, nonane, decane, dodecane, undecane, hexane, methyl cyclohexane, cyclopropane, cyclobutane, cyclopentane, methylcyclopentane, 1,1-dimethylcyclopentane, cis-1,2-dimethylcyclopentane, trans-1,2-dimethylcyclopentane, trans-1,3-dimethylcyclopentane, ethylcyclopentane, cyclohexane, methylcyclohexane.

Further examples of hydrocarbon diluents include benzene, toluene, xylene, ortho-xylene, para-xylene and meta-xylene.

Suitable organic diluents further include mixtures of at least two compounds selected from the groups of hydrochlorocarbons, hydrofluorocarbons, hydrochlorofluorocarbons and hydrocarbons. Specific combinations include mixtures of hydrochlorocarbons and hydrofluorocarbons such as mixtures of methyl chloride and 1,1,1,2-tetrafluoroethane in particular those of 40 to 60 vol.-% methyl chloride and 40 to 60 vol.-% 1,1,1,2-tetrafluoroethane whereby the aforementioned two diluents add up to 90 to 100 vol.-%, preferably to 95 to 100 vol. % of the total diluent, whereby the potential remainder to 100 vol. % includes other halogenated hydrocarbons; or mixtures of methyl chloride and at least one alkane or mixtures of alkanes such as mixtures comprising at least 90 wt.-%, preferably 95 wt.-% of alkanes having a boiling point at a pressure of 1013 hPa of −5° C. to 100° C. or in another embodiment 35° C. to 85° C. In another embodiment least 99.9 wt.-%, preferably 100 wt.-% of the alkanes have a boiling point at a pressure of 1013 hPa of 100° C. or less, preferably in the range of from 35 to 100° C., more preferably 90° C. or less, even more preferably in the range of from 35 to 90° C.

Depending on the nature of the polymerization intended for step b) the organic diluent is selected to allow a slurry polymerization or a solution polymerization Initiator System In step b) the monomers within the reaction medium are polymerized in the presence of an initiator system to form a medium comprising the elastomer, the organic diluent and optionally residual monomers.

Initiator systems in particular for elastomers obtained by cationic polymerizations typically comprise at least one Lewis acid and an initiator.

Lewis Acids

Suitable Lewis acids include compounds represented by formula $MX_3$, where M is a group 13 element and X is a halogen. Examples for such compounds include aluminum trichloride, aluminum tribromide, boron trichloride, boron tribromide, gallium trichloride and indium trifluoride, whereby aluminum trichloride is preferred.

Further suitable Lewis acids include compounds represented by formula $MR_{(m)}X_{(3-m)}$, where M is a group 13 element, X is a halogen, R is a monovalent hydrocarbon radical selected from the group consisting of $C_1$-$C_{12}$ alkyl, $C_6$-$C_{10}$ aryl, $C_7$-$C_{14}$ arylalkyl and $C_7$-$C_{14}$ alkylaryl radicals; and m is one or two. X may also be an azide, an isocyanate, a thiocyanate, an isothiocyanate or a cyanide.

Examples for such compounds include methyl aluminum dibromide, methyl aluminum dichloride, ethyl aluminum dibromide, ethyl aluminum dichloride, butyl aluminum dibromide, butyl aluminum dichloride, dimethyl aluminum bromide, dimethyl aluminum chloride, diethyl aluminum bromide, diethyl aluminum chloride, dibutyl aluminum bromide, dibutyl aluminum chloride, methyl aluminum sesquibromide, methyl aluminum sesquichloride, ethyl aluminum sesquibromide, ethyl aluminum sesquichloride and any mixture thereof. Preferred are diethyl aluminum chloride ($Et_2AlCl$ or DEAC), ethyl aluminum sesquichloride ($Et_{1.5}AlCl_{1.5}$ or EASC), ethyl aluminum dichloride ($EtAlCl_2$ or EADC), diethyl aluminum bromide ($Et_2AlBr$ or DEAB), ethyl aluminum sesquibromide ($Et_{1.5}AlBr_{1.5}$ or EASB) and ethyl aluminum dibromide ($EtAlBr_2$ or EADB) and any mixture thereof.

Further suitable Lewis acids include compounds represented by formula $M(RO)_nR'_mX_{(3-(m+n))}$; wherein M is a Group 13 metal; wherein RO is a monovalent hydrocarbon/radical selected from the group consisting of $C_1$-$C_{30}$ alkoxy, $C_7$-$C_{30}$ aryloxy, $C_7$-$C_{30}$ arylalkoxy, $C_7$-$C_{30}$ alkylaryloxy; R' is a monovalent hydrocarbon radical selected from the group consisting of $C_1$-$C_{12}$ alkyl, $C_6$-$C_{10}$ aryl, $C_7$-$C_{14}$ arylalkyl and $C_7$-$C_{14}$ alkylaryl radicals as defined above; n is a number from 0 to 3 and m is an number from 0 to 3 such that the sum of n and m is not more than 3;

X is a halogen independently selected from the group consisting of fluorine, chlorine, bromine, and iodine, preferably chlorine. X may also be an azide, an isocyanate, a thiocyanate, an isothiocyanate or a cyanide.

For the purposes of this invention, one skilled in the art would recognize that the terms alkoxy and aryloxy are structural equivalents to alkoxides and phenoxides respectively. The term "arylalkoxy" refers to a radical comprising both aliphatic and aromatic structures, the radical being at an alkoxy position. The term "alkylaryl" refers to a radical comprising both aliphatic and aromatic structures, the radical being at an aryloxy position.

Non-limiting examples of these Lewis acids include methoxyaluminum dichloride, ethoxyaluminum dichloride, 2,6-di-tert-butylphenoxyaluminum dichloride, methoxy methylaluminum chloride, 2,6-di-tert-butylphenoxy methylaluminum chloride, isopropoxygallium dichloride and phenoxy methylindium fluoride.

Further suitable Lewis acids include compounds represented by formula $M(RC=OO)_nR'_mX_{(3-(m+n))}$ wherein M is a Group 13 metal; wherein RC=OO is a monovalent hydrocarbacyl radical selected from the group selected from the group consisting of $C_1$-$C_{30}$ alkacyloxy, $C_7$-$C_{30}$ arylacyloxy, $C_7$-$C_{30}$ arylalkylacyloxy, $C_7$-$C_{30}$ alkylarylacyloxy radicals; R' is a monovalent hydrocarbon radical selected from the group consisting of $C_1$-$C_{12}$ alkyl, $C_6$-$C_{10}$ aryl, $C_7$-$C_{14}$ arylalkyl and $C_7$-$C_{14}$ alkylaryl radicals as defined above; n is a number from 0 to 3 and m is a number from 0 to 3 such that the sum of n and m is not more than 3; X is a halogen independently selected from the group consisting of fluorine, chlorine, bromine, and iodine, preferably chlorine. X may also be an azide, an isocyanate, a thiocyanate, an isothiocyanate or a cyanide.

The term "arylalkylacyloxy" refers to a radical comprising both aliphatic and aromatic structures, the radical being at an alkacyloxy position. The term "alkylarylacyloxy" refers to a radical comprising both aliphatic and aromatic structures, the radical being at an arylacyloxy position. Non-limiting examples of these Lewis acids include acetoxyaluminum dichloride, benzoyloxyaluminum dibromide, benzoyloxygallium difluoride, methyl acetoxyaluminum chloride, and isopropoyloxyindium trichloride.

Further suitable Lewis acids include compounds based on metals of Group 4, 5, 14 and 15 of the Periodic Table of the Elements, including titanium, zirconium, tin, vanadium, arsenic, antimony, and bismuth.

One skilled in the art will recognize, however, that some elements are better suited in the practice of the invention. The Group 4, 5 and 14 Lewis acids have the general formula $MX_4$; wherein M is Group 4, 5, or 14 metal; and X is a halogen independently selected from the group consisting of fluorine, chlorine, bromine, and iodine, preferably chlorine. X may also be a azide, an isocyanate, a thiocyanate, an isothiocyanate or a cyanide. Non-limiting examples include titanium tetrachloride, titanium tetrabromide, vanadium tetrachloride, tin tetrachloride and zirconium tetrachloride. The Group 4, 5, or 14 Lewis acids may also contain more than one type of halogen. Non-limiting examples include titanium bromide trichloride, titanium dibromide dichloride, vanadium bromide trichloride, and tin chloride trifluoride.

Group 4, 5 and 14 Lewis acids useful in this invention may also have the general formula $MR_nX_{(4-n)}$ wherein M is Group 4, 5, or 14 metal; wherein R is a monovalent hydrocarbon radical selected from the group consisting of $C_1$-$C_{12}$ alkyl, $C_6$-$C_{10}$ aryl, $C_7$-$C_{14}$ arylalkyl and $C_7$-$C_{14}$ alkylaryl radicals; n is an integer from 0 to 4; X is a halogen independently selected from the group consisting of fluorine, chlorine, bromine, and iodine, preferably chlorine. X may also be an azide, an isocyanate, a thiocyanate, an isothiocyanate or a cyanide.

The term "arylalkyl" refers to a radical comprising both aliphatic and aromatic structures, the radical being at an alkyl position.

The term "alkylaryl" refers to a radical comprising both aliphatic and aromatic structures, the radical being at an aryl position.

Non-limiting examples of these Lewis acids include benzyltitanium trichloride, dibenzyltitanium dichloride, benzylzirconium trichloride, dibenzylzirconium dibromide, methyltitanium trichloride, dimethyltitanium difluoride, dimethyltin dichloride and phenylvanadium trichloride.

Group 4, 5 and 14 Lewis acids useful in this invention may also have the general formula $M(RO)_nR'_mX_{4-(m+n)}$ wherein M is Group 4, 5, or 14 metal, wherein RO is a monovalent hydrocarbon/radical selected from the group consisting of $C_1$-$C_{30}$ alkoxy, $C_7$-$C_{30}$ aryloxy, $C_7$-$C_{30}$ arylalkoxy, $C_7$-$C_{30}$ alkylaryloxy radicals; R' is a monovalent hydrocarbon radical selected from the group consisting of, R is a monovalent hydrocarbon radical selected from the group consisting of $C_1$-$C_{12}$ alkyl, $C_6$-$C_{10}$ aryl, $C_7$-$C_{14}$ arylalkyl and $C_7$-$C_{14}$ alkylaryl radicals as defined above; n is an integer from 0 to 4 and m is an integer from 0 to 4 such that the sum of n and m is not more than 4; X is selected from the group consisting of fluorine, chlorine, bromine, and iodine, preferably chlorine. X may also be an azide, an isocyanate, a thiocyanate, an isothiocyanate or a cyanide.

For the purposes of this invention, one skilled in the art would recognize that the terms alkoxy and aryloxy are structural equivalents to alkoxides and phenoxides respectively. The term "arylalkoxy" refers to a radical comprising both aliphatic and aromatic structures, the radical being at an alkoxy position.

The term "alkylaryl" refers to a radical comprising both aliphatic and aromatic structures, the radical being at an aryloxy position. Non-limiting examples of these Lewis acids include methoxytitanium trichloride, n-butoxytitanium trichloride, di(isopropoxy)titanium dichloride, phenoxytitanium tribromide, phenylmethoxyzirconium trifluoride, methyl methoxytitanium dichloride, methyl methoxytin dichloride and benzyl isopropoxyvanadium dichloride.

Group 4, 5 and 14 Lewis acids useful in this invention may also have the general formula $M(RC=OO)_nR'_m X_{4-(m+n)}$; wherein M is Group 4, 5, or 14 metal; wherein RC=OO is a monovalent hydrocarbacyl radical selected from the group consisting of $C_1$-$C_{30}$ alkacyloxy, $C_7$-$C_{30}$ arylacyloxy, $C_7$-$C_{30}$ arylalkylacyloxy, $C_7$-$C_{30}$ alkylarylacyloxy radicals; R' is a monovalent hydrocarbon radical selected from the group consisting of $C_1$-$C_{12}$ alkyl, $C_6$-$C_{10}$ aryl, $C_7$-$C_{14}$ arylalkyl and $C_7$-$C_{14}$ alkylaryl radicals as defined above; n is an integer from 0 to 4 and m is an integer from 0 to 4 such that the sum of n and m is not more than 4; X is a halogen independently selected from the group consisting of fluorine, chlorine, bromine, and iodine, preferably chlorine. X may also be an azide, an isocyanate, a thiocyanate, an isothiocyanate or a cyanide.

The term "arylalkylacyloxy" refers to a radical comprising both aliphatic and aromatic structures, the radical being at an alkylacyloxy position.

The term "alkylarylacyloxy" refers to a radical comprising both aliphatic and aromatic structures, the radical being at an arylacyloxy position. Non-limiting examples of these Lewis acids include acetoxytitanium trichloride, benzoylzirconium tribromide, benzoyloxytitanium trifluoride, isopropoyloxytin trichloride, methyl acetoxytitanium dichloride and benzyl benzoyloxyvanadium chloride.

Group 5 Lewis acids useful in this invention may also have the general formula $MOX_3$; wherein M is a Group 5 metal and wherein X is a halogen independently selected from the group consisting of fluorine, chlorine, bromine, and iodine, preferably chlorine. A non-limiting example is vanadium oxytrichloride. The Group 15 Lewis acids have the general formula $MX_y$, wherein M is a Group 15 metal and X is a halogen independently selected from the group consisting of fluorine, chlorine, bromine, and iodine, preferably chlorine and y is 3, 4 or 5. X may also be an azide, an isocyanate, a thiocyanate, an isothiocyanate or a cyanide. Non-limiting examples include antimony hexachloride, antimony hexafluoride, and arsenic pentafluoride. The Group 15 Lewis acids may also contain more than one type of halogen. Non-limiting examples include antimony chloride pentafluoride, arsenic trifluoride, bismuth trichloride and arsenic fluoride tetrachloride.

Group 15 Lewis acids useful in this invention may also have the general formula $MR_nX_{y-n}$, wherein M is a Group 15 metal; wherein R is a monovalent hydrocarbon radical selected from the group consisting of $C_1$-$C_{12}$ alkyl, $C_6$-$C_{10}$ aryl, $C_7$-$C_{14}$ arylalkyl and $C_7$-$C_{14}$ alkylaryl radicals; and n is an integer from 0 to 4; y is 3, 4 or 5 such that n is less than y; X is a halogen independently selected from the group consisting of fluorine, chlorine, bromine, and iodine, preferably chlorine. X may also be a an azide, an isocyanate, a thiocyanate, an isothiocyanate or a cyanide. The term "arylalkyl" refers to a radical comprising both aliphatic and aromatic structures, the radical being at an alkyl position. The term "alkylaryl" refers to a radical comprising both aliphatic and aromatic structures, the radical being at an aryl position. Non-limiting examples of these Lewis acids include tetraphenylantimony chloride and triphenylantimony dichloride.

Group 15 Lewis acids useful in this invention may also have the general formula $M(RO)_nR'_mX_{y-(m+n)}$ wherein M is a Group 15 metal, wherein RO is a monovalent hydrocarbon/radical selected from the group consisting of $C_1$-$C_{30}$ alkoxy, $C_7$-$C_{30}$ aryloxy, $C_7$-$C_{30}$ arylalkoxy, $C_7$-$C_{30}$ alkylaryloxy radicals; R' is a monovalent hydrocarbon radical selected from the group consisting of $C_1$-$C_{12}$ alkyl, $C_6$-$C_{10}$ aryl, $C_7$-$C_{14}$ arylalkyl and $C_7$-$C_{14}$ alkylaryl radicals as defined above; n is an integer from 0 to 4 and m is an integer from 0 to 4 and y is 3, 4 or 5 such that the sum of n and m is less than y; X is a halogen independently selected from the group consisting of fluorine, chlorine, bromine, and iodine, preferably chlorine. X may also be an azide, an isocyanate, a thiocyanate, an isothiocyanate or a cyanide. For the purposes of this invention, one skilled in the art would recognize that the terms alkoxy and aryloxy are structural equivalents to alkoxides and phenoxides respectively. The term "arylalkoxy" refers to a radical comprising both aliphatic and aromatic structures, the radical being at an alkoxy position. The term "alkylaryl" refers to a radical comprising both aliphatic and aromatic structures, the radical being at an aryloxy position. Non-limiting examples of these Lewis acids include tetrachloromethoxyantimony, dimethoxytrichloroantimony, dichloromethoxyarsine, chlorodimethoxyarsine, and difluoromethoxyarsine. Group 15 Lewis acids useful in this invention may also have the general formula $M(RC=OO)_nR'_mX_{y-(m+n)}$; wherein M is a Group 15 metal; wherein RC=OO is a monovalent hydrocarbacyloxy radical selected from the group consisting of $C_1$-$C_{30}$ alkacyloxy, $C_7$-$C_{30}$ arylacyloxy, $C_7$-$C_{30}$ arylalkylacyloxy, $C_7$-$C_{30}$ alkylarylacyloxy radicals; R' is a monovalent hydrocarbon radical selected from the group consisting of $C_1$-$C_{12}$ alkyl, $C_6$-$C_{10}$ aryl, $C_7$-$C_{14}$ arylalkyl and $C_7$-$C_{14}$ alkylaryl radicals as defined above; n is an integer from 0 to 4 and m is an integer from 0 to 4 and y is 3, 4 or 5 such that the sum of n and m is less than y; X is a halogen independently selected from the group consisting of fluorine, chlorine, bromine, and iodine, preferably chlorine. X may also be an azide, an isocyanate, a thiocyanate, an isothiocyanate or a cyanide. The term "arylalkylacyloxy" refers to a radical comprising both aliphatic and aromatic structures, the radical being at an alkyacyloxy position. The term "alkylarylacyloxy" refers to a radical comprising both aliphatic and aromatic structures, the radical being at an arylacyloxy position. Non-limiting examples of these Lewis acids include acetatotetrachloroantimony, (benzoato) tetrachloroantimony, and bismuth acetate chloride.

Lewis acids such as methylaluminoxane (MAO) and specifically designed weakly coordinating Lewis acids such as $B(C_6F_5)_3$ are also suitable Lewis acids within the context of the invention.

Weakly coordinating Lewis acids are exhaustively disclosed in WO 2004/067577A in sections [117] to [129] which are hereby incorporated by reference.

Initiators

Initiators useful in this invention are those initiators which are capable of being complexed with the chosen Lewis acid to yield a complex which reacts with the monomers thereby forming a propagating polymer chain.

In a preferred embodiment the initiator comprises at least one compound selected from the groups consisting of water, hydrogen halides, carboxylic acids, carboxylic acid halides, sulfonic acids, sulfonic acid halides, alcohols, phenols, tertiary alkyl halides, tertiary aralkyl halides, tertiary alkyl esters, tertiary aralkyl esters, tertiary alkyl ethers, tertiary aralkyl ethers, alkyl halides, aryl halides, alkylaryl halides and arylalkylacid halides.

Preferred hydrogen halide initiators include hydrogen chloride, hydrogen bromide and hydrogen iodide. A particularly preferred hydrogen halide is hydrogen chloride.

Preferred carboxylic acids include both aliphatic and aromatic carboxylic acids. Examples of carboxylic acids useful in this invention include acetic acid, propanoic acid, butanoic acid; cinnamic acid, benzoic acid, 1-chloroacetic acid, dichloroacetic acid, trichloroacetic acid, trifluoroacetic acid, p-chlorobenzoic acid, and p-fluorobenzoic acid. Particularly preferred carboxylic acids include trichloroacetic acid, trifluoroacteic acid, and p-fluorobenzoic acid.

Carboxylic acid halides useful in this invention are similar in structure to carboxylic acids with the substitution of a halide for the OH of the acid. The halide may be fluoride, chloride, bromide, or iodide, with the chloride being preferred.

Carboxylic acid halides useful in this invention include acetyl chloride, acetyl bromide, cinnamyl chloride, benzoyl chloride, benzoyl bromide, trichloroacetyl chloride, trifluoroacetylchloride, trifluoroacetyl chloride and p-fluorobenzoylchloride. Particularly preferred acid halides include acetyl chloride, acetyl bromide, trichloroacetyl chloride, trifluoroacetyl chloride and p-fluorobenzoyl chloride.

Sulfonic acids useful as initiators in this invention include both aliphatic and aromatic sulfonic acids. Examples of preferred sulfonic acids include methanesulfonic acid, trifluoromethanesulfonic acid, trichloromethanesulfonic acid and p-toluenesulfonic acid.

Sulfonic acid halides useful in this invention are similar in structure to sulfonic acids with the substitution of a halide for the OH of the parent acid. The halide may be fluoride, chloride, bromide or iodide, with the chloride being preferred. Preparation of the sulfonic acid halides from the parent sulfonic acids are known in the prior art and one skilled in the art should be familiar with these procedures. Preferred sulfonic acid halides useful in this invention include methanesulfonyl chloride, methanesulfonyl bromide, trichloromethanesulfonyl chloride, trifluoromethanesulfonyl chloride and p-toluenesulfonyl chloride.

Alcohols useful in this invention include methanol, ethanol, propanol, 2-propanol, 2-methylpropan-2-ol, cyclohexanol, and benzyl alcohol.

Phenols useful in this invention include phenol; 2-methylphenol; 2,6-dimethylphenol; p-chlorophenol; p-fluorophenol; 2,3,4,5,6-pentafluorophenol; and 2-hydroxynaphthalene.

The initiator system may further comprise oxygen- or nitrogen-containing compounds other than the aforementioned to further influence or enhance the activity.

Such compounds include ethers, amines, N-heteroaromatic compounds, ketones, sulfones and sulfoxides as well as carboxylic acid esters and amides Ethers include methyl ethyl ether, diethyl ether, di-n-propyl ether, tert.-butyl-methyl ether, di-n-butyl ether, tetrahydrofurane, dioxane, anisole or phenetole.

Amines include n-pentyl amine, N,N-diethyl methylamine, N,N-dimethyl propylamine, N-methyl butylamine, N,N-dimethyl butylamine, N-ethyl butylamine, hexylamine, N-methyl hexylamine, N-butyl propylamine, heptyl amine, 2-amino heptane, 3-amino heptane, N,N-dipropyl ethyl amine, N,N-dimethyl hexylamine, octylamine, aniline, benzylamine, N-methyl aniline, phenethylamine, N-ethyl aniline, 2,6-diethyl aniline, amphetamine, N-propyl aniline, phentermine, N-butyl aniline, N,N-diethyl aniline, 2,6-diethyl aniline, diphenylamine, piperidine, N-methyl piperidine and triphenylamine.

N-heteroaromatic compounds include pyridine, 2-,3- or 4-methyl pyridine, dimethyl pyridine, ethylene pyridine and 3-methyl-2-phenyl pyridine.

Ketones include acetone, butanone, pentanone, hexanone, cyclohexanone, 2,4-hexanedione, acetylacetone and acetonyl acetone.

Sulfones and sulfoxides include dimethyl sulfoxide, diethyl sulfoxide and sulfolane.

Carboxylic acid esters include methyl acetate, ethyl acetate, vinyl acetate, propyl acetate, allyl acetate, benzyl acetate, methyl acrylate, ethyl acrylate, propyl acrylate, butyl acrylate, methyl methacrylate, ethyl methacrylate, propyl methacrylate, butyl methacrylate, dimethyl maleate, diethyl maleate, dipropyl maleate, methyl benzoate, ethyl benzoate, propyl benzoate, butyl benzoate, allyl benzoate, butylidene benzoate, benzyl benzoate, phenylethyl benzoate, dimethyl phthalate, diethyl phthalate, dipropyl phthalate, dibutyl phthalate, dipentyl phthalate, dihexyl phthalate, diheptyl phthalate and dioctyl phthalate.

Carboxylic acid amides include N,N-dimethyl formamide, N,N-dimethyl acetamide, N,N-diethyl formamide and N,N-diethyl acetamide.

Preferred tertiary alkyl and aralkyl initiators include tertiary compounds represented by the formula below: wherein X is a halogen, pseudohalogen, ether, or ester, or a mixture thereof, preferably a halogen, preferably chloride and $R_1$, $R_2$ and $R_3$ are independently any linear, cyclic or branched chain alkyls, aryls or arylalkyls, preferably comprising 1 to 15 carbon atoms and more preferably 1 to 8 carbon atoms. n is the number of initiator sites and is a number greater than or equal to 1, preferably between 1 to 30, more preferably n is a number from 1 to 6. The arylalkyls may be substituted or unsubstituted. For the purposes of this invention and any claims thereto, arylalkyl is defined to mean a compound comprising both aromatic and aliphatic structures. Preferred examples of initiators include 2-chloro-2,4,4-trimethylpentane; 2-bromo-2,4,4-trimethylpentane; 2-chloro-2-methylpropane; 2-bromo-2-methylpropane; 2-chloro-2,4,4,6,6-pentamethylheptane; 2-bromo-2,4,4,6,6-pentamethylheptane; 1-chloro-1-methylethylbenzene; 1-chloroadamantane; 1-chloroethylbenzene; 1,4-bis(1-chloro-1-methylethyl)benzene; 5-tert-butyl-1,3-bis(1-chloro-1-methylethyl)benzene; 2-acetoxy-2,4,4-trimethylpentane; 2-benzoyloxy-2,4,4-trimethylpentane; 2-acetoxy-2-methylpropane; 2-benzoyloxy-2-methylpropane; 2-acetoxy-2,4,4,6,6-pentamethylheptane; 2-benzoyl-2,4,4,6,6-pentamethylheptane; 1-acetoxy-1-methylethylbenzene; 1-aceotxyadamantane; 1-benzoyloxyethylbenzene; 1,4-bis(1-acetoxy-1-methylethyl)benzene; 5-ten-butyl-1,3-bis(1-acetoxy-1-methylethyl)benzene; 2-methoxy-2,4,4-trimethylpentane; 2-isopropoxy-2,4,4-trimethylpentane; 2-methoxy-2-methylpropane; 2-benzyloxy-2-methylpropane; 2-methoxy-2,4,4,6,6-pentamethylheptane; 2-isopropoxy-2,4,4,6,6-pentamethylheptane; 1-methoxy-1-methylethylbenzene; 1-methoxyadamantane; 1-methoxyethylbenzene; 1,4-bis(1-methoxy-1-methylethyl)benzene; 5-tert-butyl-1,3-bis(1-methoxy-1-methylethyl)benzene and 1,3,5-tris(1-chloro-1-methylethyl)benzene. Other suitable initiators can be found in U.S. Pat. No. 4,946,899. For the purposes of this invention and the claims thereto pseudohalogen is defined to be any compound that is an azide, an isocyanate, a thiocyanate, an isothiocyanate or a cyanide.

Another preferred initiator is a polymeric halide, one of $R_1$, $R_2$ or $R_3$ is an olefin polymer and the remaining R groups are defined as above. Preferred olefin polymers include polyisobutylene, polypropylene, and polyvinylchloride. The polymeric initiator may have halogenated tertiary carbon positioned at the chain end or along or within the backbone of the polymer. When the olefin polymer has multiple halogen atoms at tertiary carbons, either pendant to or within the polymer backbone, the product may contain polymers which have a comb like structure and/or side chain branching depending on the number and placement of the halogen atoms in the olefin polymer. Likewise, the use of a chain end tertiary polymer halide initiator provides a method for producing a product which may contain block elastomers.

Particularly preferred initiators may be any of those useful in cationic polymerization of isobutylene elastomers including: water, hydrogen chloride, 2-chloro-2,4,4-trimethylpentane, 2-chloro-2-methylpropane, 1-chloro-1-methylethylbenzene, and methanol.

Initiator systems useful in this invention may further comprise compositions comprising a reactive cation and a weakly-coordinating anion ("WCA□") as defined above.

A preferred mole ratio of Lewis acid to initiator is generally from 1:5 to 100:1 preferably from 5:1 to 100:1, more preferably from 8:1 to 20:1 or, in another embodiment, of from 1:1,5 to 15:1, preferably of from 1:1 to 10:1. The initiator system including the lewis acid and the initiator is preferably present in the reaction mixture in an amount of 0.002 to 5.0 wt.-%, preferably of 0.1 to 0.5 wt.-%, based on the weight of the monomers employed.

In another embodiment, in particular where aluminum trichloride is employed the wt.-ratio of monomers employed to lewis acid, in particular aluminum trichloride is within a range of 500 to 20000, preferably 1500 to 10000.

In one embodiment at least one control agent for the initiator system is employed. Control agent help to control activity and thus to adjust the properties, in particular the molecular weight of the desired elastomer, see e.g. U.S. Pat. No. 2,580,490 and U.S. Pat. No. 2,856,394.

Suitable control agents comprise ethylene, mono- or di-substituted $C_3$-$C_{20}$ monoalkenes, whereby substitution is meant to denote the alkyl-groups bound to the olefinic double bond. Preferred control agents are monosubstituted $C_3$-$C_{20}$ monoalkenes (also called primary olefins), more preferred control agents are ($C_3$-$C_{20}$)-1-alkenes, such as 1-butene. The aforementioned control agents ethylene, mono- or di-substituted $C_3$-$C_{20}$ monoalkenes are typically applied in an amount of from 0.01 to 20 wt.-% calculated on the monomers employed in step a), preferably in an amount of from 0.2 to 15 wt.-% and more preferably in an amount of from 1 to 15 wt.-%.

Another suitable control agent comprises diisobutylene (2,4,4-trimethyl-1-pentene). Diisobutylene may be used alternatively or additionally to ethylene, mono- or di-substituted $C_3$-$C_{20}$ monoalkenes. Diisobutylene is typically applied in an amount of from 0.001 to 3 wt.-% calculated on the monomers employed in step a), preferably in an amount of from 0.01 to 2 wt.-% and more preferably in an amount of from 0.01 to 1.5 wt.-%. It is of course understood that greater or lesser amounts of initiator are still within the scope of this invention.

In a particularly preferred initiator system, the Lewis acid is ethyl aluminum sesquichloride, preferably generated by mixing equimolar amounts of diethyl aluminum chloride and ethyl aluminum dichloride, preferably in a diluent. The diluent is preferably the same one used to perform the copolymerization reaction.

Where alkyl aluminum halides are employed water and/or alcohols, preferably water is used as proton source.

In one embodiment the amount of water is in the range of 0.40 to 4.0 moles of water per mole of aluminum of the alkyl aluminum halides, preferably in the range of 0.5 to 2.5 moles of water per mole of aluminum of the alkyl aluminum halides, most preferably 1 to 2 moles of water per mole of the alkyl aluminum halides.

Where aluminum halides, in particular aluminum trichloride are employed water and/or alcohols, preferably water is used as proton source.

In one embodiment the amount of water is in the range of 0.05 to 2.0 moles of water per mole of aluminum in the aluminum halides, preferably in the range of 0.1 to 1.2 moles of water per mole of aluminum in the aluminum halides.

Polymerization Conditions

In one embodiment, the organic diluent and the monomers employed are substantially free of water. As used herein substantially free of water is defined as less than 50 ppm based upon total weight of the reaction medium, preferably less than 30 ppm, more preferably less than 20 ppm, even more preferably less than 10 ppm, yet even more preferably less than 5 ppm.

One skilled of the art is aware that the water content in the organic diluent and the monomers needs to be low to ensure that the initiator system is not affected by additional amounts of water which are not added by purpose e.g. to serve as an initiator.

Steps a) and/or b) may be carried out in continuous or batch processes, whereby continuous processes are preferred.

In an embodiment of the invention the polymerization according to step b) is effected using a polymerization reactor. Suitable reactors are those known to the skilled in the art and include flow-through polymerization reactors, plug flow reactor, stirred tank reactors, moving belt or drum reactors, jet or nozzle reactors, tubular reactors, and autorefrigerated boiling-pool reactors. Specific suitable examples are disclosed in WO 2011/000922 A and WO 2012/089823 A.

In one embodiment, the polymerization according to step b) is carried out where the initiator system, the monomers and the organic diluent are present in a single phase. Preferably, the polymerization is carried-out in a continuous polymerization process in which the initiator system, monomer(s) and the organic diluent are present as a single phase.

Depending on the choice of the organic diluent the polymerization according to step b) is carried out either as slurry polymerization or solution polymerization.

In slurry polymerization, the monomers, the initiator system are all typically soluble in the diluent or diluent mixture, i.e., constitute a single phase, while the elastomer upon formation precipitates from the organic diluent. Desirably, reduced or no polymer "swelling" is exhibited as indicated by little or no Tg suppression of the polymer and/or little or no organic diluent mass uptake.

In solution polymerization, the monomers, the initiator system are all typically soluble in the diluent or diluent mixture, i.e., constitute a single phase as is the elastomer formed during polymerization.

The solubilities of the desired polymers in the organic diluents described above as well as their swelling behaviour under reaction conditions is well known to those skilled in the art.

The advantages and disadvantages of solution versus slurry polymerization are exhaustively discussed in the literature and thus are also known to those skilled in the art.

In one embodiment step b) is carried out at a temperature in the range of −110° C. to 20° C., preferably in the range of −100° D to −50° C. and even more preferably in the range of −100° C. to −70° C.

In a preferred embodiment, the polymerization temperature is within 20° C. above the freezing point of the organic diluent, preferably within 10° C. above the freezing point of the organic diluent.

The reaction pressure in step b) is typically from 100 to 100,000 hP, preferably from 200 to 20,000 hPa, more preferably from 500 to 5,000 hPa.

The polymerization according to step b) is typically carried out in a manner that the solids content of the slurry in step b) is preferably in the range of from 1 to 45 wt.-%, more preferably 3 to 40 wt.-%, even more preferably 15 to 40 wt.-%.

As used herein the terms □solids content□ or □solids level□ refer to weight percent of the elastomer obtained according to step b) i.e. in polymerization and present in the medium comprising the elastomer, the organic diluent and optionally residual monomers obtained according to step b).

In one embodiment the reaction time in step b) is from 2 min to 2 h, preferably from 10 min to 1 h and more preferably from 20 to 45 min.

The process may be carried out batchwise or continuously. Where a continuous reaction is performed the reaction time given above represents the average residence time.

In one embodiment the reaction is stopped by quenching agents for example a 1 wt.-% sodium hydroxide solution in water, methanol or ethanol.

In another embodiment the reaction is quenched by the contact with the aqueous medium in step A), which in one embodiment may have a pH value of 5 to 10, preferably 6 to 9 and more preferably 7 to 9 measured at 20° C. and 1013 hPa.

The pH-Adjustment where desired may be performed by addition of acids or alkaline compounds which preferably do not contain multivalent metal ions. pH adjustment to higher pH values is e.g. effected by addition of sodium or potassium hydroxide.

In particular for solution polymerizations the conversion is typically stopped after a monomer consumption of from 5 wt.-% to 25 wt.-%, preferably 10 wt.-% to 20 wt.-% of the initially employed monomers.

Monomer conversion can be tracked by online viscometry or spectroscopic monitoring during the polymerization.

In step A) the organic medium, for example those obtained according to step b), is contacted with an aqueous medium comprising at least one LCST compound having a cloud point of 0 to 100° C., preferably 5 to 100° C., more preferably 15 to 80° C. and even more preferably 20 to 70° C. and removing at least partially the organic diluent to obtain the aqueous slurry comprising the plurality elastomer particles.

The contact can be performed in any vessel suitable for this purpose. In industry such contact is typically performed in a flash drum or any other vessel known for separation of a liquid phase and vapours.

Removal of organic diluent may also employ other types of distillation so to subsequently or jointly remove the residual monomers and the organic diluent to the desired extent. Distillation processes to separate liquids of different boiling points are well known in the art and are described in, for example, the *Encyclopedia of Chemical Technology*, Kirk Othmer, 4th Edition, pp. 8-311, which is incorporated herein by reference. Generally, the organic diluent may either be separately or jointly be recycled into a step a) of a polymerization reaction.

The pressure in step A) and in one embodiment the steam-stripper or flash drum depends on the organic diluent and where applicable, monomers employed in step b) but is typically in the range of from 100 hPa to 5,000 hPa.

The temperature in step A) is selected to be sufficient to at least partially remove the organic diluent and to the extent still present residual monomers.

In one embodiment the temperature is from 10 to 100° C., preferably from 50 to 100° C., more preferably from 60 to 95° C. and even more preferably from 75 to 95° C.

Upon contact of the organic medium with the aqueous medium comprising at least one LCST compound, the medium is destabilized due to removal of the stabilizing organic diluent and in some cases especially where the organic medium has a temperature below the glass transition temperature of the elastomer typically rapid heating above the glass transition temperature of the elastomer thereby forming elastomer particles suspended in the aqueous slurry.

According to the observations of the applicant and without wanting to be bound by theory a further consequence is that the at least LCST compound as earlier observed for conventional anti-agglomerants such as calcium stearate, the aqueous medium comprising the at least one LCST compound depletes from LCST compounds so that in the final aqueous slurry at least a part, according to the observations disclosed in the experimental part a substantial part of the LCST compounds are part of the elastomer particles and are presumably bound to the surface of the elastomer particles causing the tremendous anti-agglomerating effect. Suitable LCST compounds are for example selected from the group consisting of:

poly(N-isopropylacrylamide), poly(N-isopropylacrylamide-co-N,N-dimethylacrylamide, poly(N-isopropylacrylamide)-alt-2-hydroxyethylmethacrylate, poly(N-vinylcaprolactam), poly(N,N-diethylacrylamide), poly[2-(dimethylamino)ethyl methacrylate], poly(2-oxazoline) glyelastomers, Poly(3-ethyl-N-vinyl-2-pyrrolidone), hydroxylbutyl chitosan, polyoxyethylene (20) sorbitan monostearate, polyoxyethylene (20) sorbitan monolaurate, polyoxyethylene (20) sorbitan monooleate, methyl cellulose, hydroxypropyl cellulose, hydroxyethyl methylcellulose, hydroxypropyl methylcellulose, poly(ethylene glycol) methacrylates with 2 to 6 ethylene glycol units, polyethyleneglycol-co-polypropylene glycols, preferably those with 2 to 6 ethylene glycol units and 2 to 6 polypropylene units, compounds of formula (I)

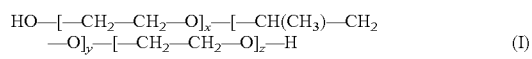

$$\text{HO-[-CH}_2\text{-CH}_2\text{-O]}_x\text{-[-CH(CH}_3)\text{-CH}_2\text{-O]}_y\text{-[-CH}_2\text{-CH}_2\text{-O]}_z\text{-H} \quad (I)$$

with y=3 to 10 and x and z=1 to 8, whereby y+x+z is from 5 to 18, polyethyleneglycol-co-polypropylene glycol, preferably those with 2 to 8 ethylene glycol units and 2 to 8 polypropylene units, ethoxylated iso-$C_{13}H_{27}$-alcohols, preferably with an ethoxylation degree of 4 to 8, polyethylene glycol with 4 to 50, preferably 4 to 20 ethyleneglycol units, polypropylene glycol with 4 to 30, preferably 4 to 15 propyleneglycol units, polyethylene glycol monomethyl, dimethyl, monoethyl and diethyl ether with 4 to 50, preferably 4 to 20 ethyleneglycol units, polypropylene glycol monomethyl, dimethyl, monoethyl and diethyl ether with 4 to 50, preferably 4 to 20 propyleneglycol units, whereby in another embodiment the aforementioned LCST compounds additionally include hydroxyethylcellulose and whereby methyl cellulose, hydroxypropyl cellulose, hydroxyethyl methylcellulose and hydroxypropyl methylcellulose are preferred.

In one embodiment methyl cellulose, hydroxypropyl cellulose, hydroxyethyl methylcellulose and hydroxypropyl methylcellulose have a degree of substitution of from 0.5 to 2.8 the theoretical maximum being 3, preferably 1.2 to 2.5 and more preferably 1.5 to 2.0.

In one embodiment hydroxypropyl cellulose, hydroxyethyl methylcellulose and hydroxypropyl methylcellulose have a MS (moles of substitution) of from 3, preferably of from 4, more preferably of from 4 to 20 with respect to ethylene glycol or propylene glycol groups per glucose unit.

The amount of LCST compound(s) present in the aqueous medium employed in step A) is for example of from 1 to 20,000 ppm, preferably 3 to 10,000 ppm, more preferably 5 to 5,000 ppm and even more preferably 10 to 5,000 ppm with respect to the amount of elastomer present in the organic medium.

In one embodiment the LCST compounds exhibit a molecular weight of at least 1,500 g/mol, preferably at least 2,500 g/mol and more preferably at least 4,000 g/mol.

Where a mixture of different LCST compounds is applied the weight average molecular weight is for example of from 1,500 to 2,000,000.

The unique capability of the LCST compounds to stabilize elastomer particles in aqueous solution is a major finding of the invention. The invention therefore also encompasses a method to prevent or reduce or to slow-down agglomeration of slurries comprising elastomer particles suspended in aqueous media by addition or use of LCST compounds having a cloud point of 0 to 100° C., preferably 5 to 100° C., more preferably 15 to 80° C. and even more preferably 20 to 70° C.

For the avoidance of doubt it is noted that the aqueous slurry obtained in step A) is distinct from and unrelated to the polymerization slurry that may be obtained in some embodiments described in step b).

In case step b) was carried out as solution polymerization upon contact with water the organic diluent is evaporated and the elastomer forms elastomer particles suspended in the aqueous slurry.

The at least partial removal of the organic diluent typically requires significant amounts of heat to balance the heat of evaporation which can be provided for example by heating the vessel wherein step A) is performed either from outside or in a preferred embodiment additionally or alternatively by introducing steam which further aids removal of organic diluent and to the extent still present after polymerization the monomers (steam stripping).

Step A) may be carried out batchwise or continuously, whereby a continuous operation is preferred.

In one embodiment the temperature of the resulting slurry obtained in step A) is from 50 to 100° C., preferably from 60 to 100° C., more preferably from 70 to 95° C. and even more preferably from 75 to 95° C.

Even found not to be necessary in one embodiment the temperature in step A) is above the highest determined cloud point of the at least one LCSTs compound employed.

Highest determined cloud point means the highest cloud point measured with the five or in another embodiment three methods disclosed above. If a cloud point cannot be determined for whatever reason with one or two methods the highest cloud point of the other determinations is taken as the highest determined cloud point.

In one embodiment the removal of the organic diluent is performed until the aqueous slurry comprises less than 10 wt.-% of organic diluent calculated on the elastomer contained in the elastomer particles of the resulting aqueous slurry, preferably less than 7 wt.-% and even more preferably less than 5 wt.-% and yet even more preferably less than 3 wt.-%.

It was not known before and is highly surprising that an aqueous slurry comprising a plurality of elastomer particles with very low levels or even absence of antiagglomerants selected from carboxylic acid salts of mono- or multivalent metal ions and layered minerals can be obtained at all.

Therefore, the use of LCST compounds having a cloud point of 0 to 100° C., preferably 5 to 100° C., more preferably 15 to 80 and even more preferably 20 to 70° C. as anti-agglomerant, in particular for elastomer particles as defined is encompassed by the invention as well.

The aqueous slurries disclosed hereinabove and as obtainable according to step A) as such are therefore also encompassed by the invention.

The aqueous slurries obtained according to step A) serve as an ideal starting material to obtain the elastomer particles in isolated form.

Therefore, in a further step C) the elastomer particles contained in the aqueous slurry obtained according to step B) may be separated to obtain the elastomer particles.

The separation may be effected by flotation, centrifugation, filtration, dewatering in a dewatering extruder or by any other means known to those skilled in the art for the separation of solids from fluids.

In one embodiment the separated aqueous phase is recycled into step A) if required after replacement of LCST-compounds, water and optionally other components which were removed with the elastomer particles.

In a further step D) the elastomer particles obtained according to step C) are dried, preferably to a residual content of volatiles of 7,000 or less, preferably 5,000 or less, even more preferably 4,000 or less and in another embodiment 2,000 ppm or less, preferably 1,000 ppm or less.

As used herein the term volatiles denotes compounds having a boiling point of below 250° C., preferably 200° C. or less at standard pressure and include water as well as remaining organic diluents.

It has been observed that after step D), material produced according to the invention without the use of calcium stearate shows reduced fines in the finishing process when compared to material produced according to standard methods. Reducing fines shows advantages in fouling and reduced cleaning frequency required in step D).

Drying can be performed using conventional means known to those in the art, which includes drying on a heated mesh conveyor belt.

Depending on the drying process the elastomer particles may also be brought into a different shape hereinafter referred to as reshaped elastomer particles. Reshaped elastomer particles are for example pellets. Such reshaped elastomer particles are also encompassed by the invention and for example obtained by drying in an extruder followed by pelletizing at the extruder outlet. Such pelletizing may also be performed under water. The process according to the invention allows preparation of elastomer particles and reshaped elastomer particles having a tunable or if desired an unprecedented low level of mono- and multivalent metal ions.

Where desired, e.g. to produce perform-alike products having usual levels of multivalent stearates or palmitates, in particular calcium stearate and palmitate or zinc stearate and palmitate, these multivalent stearates or palmitates may be added to the (reshaped) elastomer particles obtained according to the invention e.g. at step C) or D), preferably step C). This may be effected e.g. in step e) by spraying aqueous suspensions of said multivalent stearates and/or palmitates onto the (reshaped) elastomer particles. Multivalent stearates and/or palmitates, in particular calcium and/or zinc stearate and/or palmitate may also be added at any point or step after the formation of the aqueous slurry of elastomer particles according to steps A) and B).

It is also possible to realize certain advantages of the LCST agents by adding at least one LCST agent to a production process using anti-agglomerants known in the prior art for steps A) and B): In particular agglomeration of elastomer particles in an aqueous slurries produced through use of multivalent stearates and/or palmitates such as calcium and/or zinc stearate and/or palmitate can be substantially delayed through the addition of at least one LCST agent after formation of elastomer particles.

As a consequence the invention encompasses also the general use of LCST compounds, including their preferred embodiments, in processing of elastomer particles.

The invention therefore encompasses (reshaped) elastomer particles having a elastomer content of 98.5 wt.-% or more, preferably 98.8 wt.-% or more, more preferably, 99.0 wt.-% or more even more preferably 99.2 wt.-% or more, yet even more preferably 99.4 wt.-% or more and in another embodiment 99.5 wt.-% or more preferably 99.7 wt.-% or more.

In one embodiment the (reshaped)elastomer particles comprise 550 ppm or less, preferably 400 ppm or less, more preferably 300 ppm or less, even more preferably 250 ppm or less and yet even more preferably 150 ppm or less and in another yet even more preferred embodiment 100 ppm or less of salts of mono- or multivalent metal ions calculated on their metal content and with respect to the amount of elastomer present in the organic medium.

In one embodiment the (reshaped)elastomer particles comprise 5000 ppm or less, preferably 2.000 ppm or less, more preferably 1.000 ppm or less, even more preferably 500 ppm or less and yet even more preferably 100 ppm or less and in another yet even more preferred embodiment 50 ppm or less, preferably 50 ppm or less more preferably 10 ppm or less and yet even more preferably no non-LCST compounds selected from the group consisting of ionic or non-ionic surfactants, emulsifiers, and antiagglomerants.

In another aspect the invention provides (reshaped) elastomer particles comprising salts of multivalent metal ions in an amount of 500 ppm or less, preferably 400 ppm or less, more preferably 250 ppm or less, even more preferably 150 ppm or less and yet even more preferably 100 ppm or less and in an even more preferred embodiment 50 ppm or less calculated on their metal content.

The (reshaped) elastomer particles according to the invention may further comprise antioxidants e.g. at least one antioxidant of those listed above.

Particularly preferred are pentaerythrol-tetrakis-[3-(3,5-di-tert.-butyl-4-hydroxyphenyl)-propanoic acid (also known as Irganox☐ 1010) and 2,6-di-tert.-butyl-4-methyl-phenol (BHT).

The amount of antioxidant in the (reshaped) elastomer particles is for example of from 50 ppm to 1000 ppm, preferably of from 80 ppm to 500 ppm and in another embodiment of from 300 ppm to 700 ppm.

Typically the remainder to 100 wt.-% include the LCST compound(s), volatiles, to the extent employed at all salts of multivalent metal ions as well as low levels of residual monovalent metal ion salts such as sodium chloride.

In one embodiment the amount of LCST compounds present in the (reshaped) elastomer particles is from 1 ppm to 18,000 ppm, preferably of from 1 ppm to 10,000 ppm, more preferably 1 ppm to 5,000 ppm, even more preferably from 1 ppm to 2,000 ppm and in a more preferred embodiment from 5 to 1,000 ppm or from 5 to 500 ppm.

In one embodiment the amount of salts of monovalent metal ions present in the (reshaped) elastomer particles is from 1 ppm to 1,000 ppm, preferably from 10 ppm to 500 ppm and in a more preferred embodiment from 10 to 200 ppm.

In one embodiment the amount of stearates or palmitates of mono- or multivalent metal ions present in the (reshaped) elastomer particles is 0 to 4,000 ppm, preferably 0 to 2,000 ppm, more preferably 0 to 1,000 ppm and in a more preferred embodiment from 0 to 500 ppm.

In one embodiment the amount of LCST compounds present in the (reshaped) elastomer particles is from 1 ppm to 5,000 ppm, preferably from 1 ppm to 2,000 ppm and in a more preferred embodiment from 5 to 1,000 ppm or from 5 to 500 ppm.

In another preferred embodiment the amount of LCST compounds present in the (reshaped) elastomer particles is from 5 to 100 ppm, preferably from 5 to 50 ppm and more preferably from 5 to 30 ppm.

In one embodiment the amount of salts of monovalent metal ions present in the (reshaped) elastomer particles is from 1 ppm to 1,000 ppm, preferably from 10 ppm to 500 ppm and in a more preferred embodiment from 10 to 200 ppm.

In one embodiment the amount of stearates or palmitates of multivalent metal ions present in the (reshaped) elastomer particles is 0 to 4,000 ppm, preferably 0 to 2,000 ppm, more preferably 0 to 1,000 ppm and in a more preferred embodiment from 0 to 500 ppm.

Where an LCST compound is defined as a mandatory component the invention not only encompasses elastomer particles or reshaped elastomer particles herein jointly referred to as (reshaped) elastomer particles but any type of elastomer composition comprising the LCST compounds.

In another embodiment the invention therefore encompasses a elastomer composition, in particular (reshaped) elastomer particles comprising
I) 96.0 wt.-% or more, preferably 97.0 wt.-% or more, more preferably, 98.0 wt.-% or more even more preferably 99.0 wt.-% or more, yet even more preferably 99.2 wt.-% or more and in another embodiment 99.5 wt.-% or more of a elastomer
II) 0 to 3.0 wt.-%, preferably 0 to 2.5 wt.-%, more preferably 0 to 1.0 wt.-% and more preferably 0 to 0.40 wt.-% of salts of mono- or multivalent metal ions, preferably stearates and palmitates of multivalent metal ions and
III) 1 ppm to 5,000 ppm, preferably from 1 ppm to 2,000 ppm and in a more preferred embodiment from 5 to 1,000 ppm or from 5 to 500 ppm of at least one LCST compound.

Since salts of multivalent metal ions contribute to the ash content measurable according to ASTM D5667 (reapproved version 2010) the invention further encompasses a elastomer composition, in particular (reshaped) elastomer particles comprising 98.5 wt.-% or more, preferably 98.8 wt.-% or more, more preferably, 99.0 wt.-% or more even more preferably 99.2 wt.-% or more, yet even more preferably 99.4 wt.-% or more and in another embodiment 99.5 wt.-% or more of a elastomer and having an ash content measured according to ASTM D5667 of 0.08 wt.-% or less, preferably 0.05 wt.-% or less, more preferably 0.03 wt.-% or less and even more preferably 0.015 wt.-% or less.

In a preferred embodiment the aforementioned elastomer composition, in particular (reshaped) elastomer particles further comprise 1 ppm to 5,000 ppm, preferably from 1 ppm to 2,000 ppm and in a more preferred embodiment from 5 to 1,000 ppm or from 5 to 500 ppm of a least one LCST compound.

In yet another embodiment the invention encompasses a elastomer composition, in particular (reshaped) elastomer particles comprising
I) 100 parts by weight of a elastomer (100 phr)
II) 0.0001 to 0.5, preferably 0.0001 to 0.2, more preferably 0.0005 to 0.1, even more preferably 0.0005 to 0.05 phr of a least one LCST compound and
III) no or from 0.0001 to 3.0, preferably no or from 0.0001 to 2.0, more preferably no or from 0.0001 to 1.0, even more preferably no or from 0.0001 to 0.5, yet even more preferably no or from 0.0001 to 0.3, and most preferably no or from 0.0001 to 0.2 phr of salts of mono- or multivalent metal ions, preferably stearates and palmitates of mono- or multivalent metal ions, preferably comprising calcium stearate, calcium palmitate, zinc stearate or zinc palmitate and
IV) no or from 0.005 to 0.3, preferably 0.05 to 0.1, more preferably from 0.008 to 0.05 and yet more preferably from 0.03 to 0.07 parts by weight of antioxidants
V) from 0.005 to 1.5, preferably 0.05 to 1.0, more preferably 0.005 to 0.5, even more preferably from 0.01 to 0.3 and yet even more preferably from 0.05 to 0.2 parts by weight of volatiles having a boiling point at standard pressure of 2000 or less.

Preferably the aforementioned components I) to V) add up to 100.00501 to 105.300000 parts by weight (phr), preferably 100.00501 to 104.100000 parts by weight (phr), more preferably from 100.01 to 103.00 parts by weight, even more preferably from 100.10 to 101.50 parts by weight, yet even more preferably from 100.10 to 100.80 parts by weight and together represent 99.80 to 100.00 wt.-%, preferably 99.90 to 100.00 wt.-%, more preferably 99.95 to 100.00 wt.-% and yet even more preferably 99.97 to 100.00 wt.-% of the total weight of the elastomer composition, in particular (reshaped) elastomer particles.

The remainder, if any, may represent salts or components which are none of the aforementioned components and e.g. stemming from the water employed to prepare the aqueous phase used in step A) or, if applicable, products including decomposition products and salts remaining from the initiator system employed in step b) or other components stemming e.g. from post-polymerization modifications.

For all elastomer compositions described above in one embodiment, additionally the ash content measured according to ASTM D5667 is for example 0.2 wt.-% or less, preferably 0.1 wt.-% or less, more preferably 0.080 wt.-% or less and even more preferably 0.050 wt.-% or less, or, in another embodiment, 0.030 wt.-% or less, preferably 0.020 wt.-% or less and more preferably 0.015 wt.-% or less.

Determination of free carboxylic acids and their salts, in particular calcium and zinc stearate or palmitate can be accomplished by measurement using Gas Chromatography with a Flame Ionization Detector (GC-FID) according to the following procedure:

2 g of a sample of copolymer composition are weighed to the nearest 0.0001 g, placed in a 100 mL jar and combined with
  a) 25 mL hexane, 1,000 mL of an internal standard solution where levels of free carboxylic acids are to be determined and
  b) 25 mL hexane, 1,000 mL of an internal standard solution and 5 drops of concentrated sulfuric acid where levels of carboxylic acid salts are to be determined.

The jar is put on a shaker for 12 hours. Then 23 ml acetone are added and the remaining mixture evaporated to dryness at 50° C. which takes typically 30 minutes. Thereafter 10 ml methanol and 2 drops of concentrated sulfuric acid are added, shaken to mix and heated for 1 hour to 50° C. to convert the carboxylic acids into their methyl esters. Thereafter 10 ml hexane and 10 ml demineralized water are added, vigorously shaken and finally the hexane layer is allowed to separate. 2 ml of the hexane solution are used for GC-FID analysis.

It is known to those skilled in the art that technical stearates such as calcium and zinc stearate also contain fractions of other calcium and zinc carboxylic acid salts such as palmitates. However, GC-FID allows to determine the contents of other carboxylic acids as well.

Direct measurement of carboxylic acid salts in particular stearates and palmitates can be accomplished by FTIR as follows: A sample of rubber is pressed between two sheets of silicon release paper in a paper sample holder and analyzed on an infrared spectrometer. Calcium stearate carbonyl peaks are found at 1541.8 & 1577.2 cm$^{-1}$. The peaks of heat converted calcium stearate (a different modification of calcium stearate, see e.g. *Journal of Colloid Science* Volume 4, Issue 2, April 1949, Pages 93–101) are found at 1562.8 and 1600.6 cm$^{-1}$ and are also included in the calcium stearate calculation. These peaks are ratioed to the peak at 950 cm$^{-1}$ to account for thickness variations in the samples.

By comparing peak heights to those of known standards with predetermined levels of calcium stearate, the concentrations of calcium stearate can be determined. The same applies to other carboxylic acid salts in particular stearates and palmitates as well. For example, a single zinc stearate carbonyl peak is found at 1539.5 cm$^{-1}$, for sodium stearate a single carbonyl peak is found at 1558.5 cm$^{-1}$.

Contents of mono- or multivalent metal ions, in particular multivalent metal ions such as calcium and zinc contents can generally be determined and were determined if not mentioned otherwise by Inductively coupled plasma atomic emission spectrometry (ICP-AES) according to EPA 6010 Method C using NIST traceable calibration standards after microwave digestion according to EPA 3052 method C.

Additionally or alternatively contents of various elements can be determined by X-ray fluorescence (XRF). The sample is irradiated with X-ray radiation of sufficient energy to excite the elements of interest. The elements will give off energy specific to the element type which is detected by an appropriate detector. Comparison to standards of known concentration and similar matrix will give quantitation of the desired element. Contents of LCST compounds, in particular methyl cellulose contents are measurable and were measured using Gel Filtration Chromatography on a Waters Alliance 2690/5 separations module equipped with a PolySep-GFC-P4000, 300×7.8 mm aqueous GFC column and a PolySep-GFC-P4000, 35×7.8 mm guard column and a Waters 2414 Differential Refractometer against standards of known concentration. As gel filtration chromatography separates based on molecular weight, it may be necessary to employ different columns than those mentioned above in order to analyze for LCST compounds across different molecular weight ranges.

The samples are for example prepared according to the following procedure:

2 g of a sample of copolymer compositions are weighed to the nearest 0.0001 g and dissolved in 30 ml hexanes using a shaker at low speed overnight in a closed vial. Exactly 5 ml of HPLC grade water at room temperature are added, the vial is recapped and shaken another 30 minutes. After phase separation the aqueous phase was used for Gel Filtration Chromatography and injected via a 0.45 micron syringe filter.

It is apparent to those skilled in the art that different analytical methods may result in slightly different results. However, at least to the extent above methods are concerned, the results were found to be consistent within their specific and inherent limits of error.

Preferred elastomers are those already described in the process section above and include elastomers comprising repeating units derived from at least one isoolefin and at least one multiolefin.

Examples of suitable isoolefins include isoolefin monomers having from 4 to 16 carbon atoms, preferably 4 to 7 carbon atoms, such as isobutene, 2-methyl-1-butene, 3-methyl-1-butene, 2-methyl-2-butene. A preferred isoolefin is isobutene.

Examples of suitable multiolefins include isoprene, butadiene, 2-methylbutadiene, 2,4-dimethylbutadiene, piperyline, 3-methyl-1,3-pentadiene, 2,4-hexadiene, 2-neopentylbutadiene, 2-methyl-1,5-hexadiene, 2,5-dimethyl-2,4-hexadiene, 2-methyl-1,4-pentadiene, 4-butyl-1,3-pentadiene, 2,3-dimethyl-1,3-pentadiene, 2,3-dibutyl-1,3- pentadiene, 2-ethyl-1,3-pentadiene, 2-ethyl-1,3-butadiene, 2-methyl-1,6-heptadiene, cyclopentadiene, methylcyclopentadiene, cyclohexadiene and 1-vinyl-cyclohexadiene.

Preferred multiolefins are isoprene and butadiene. Isoprene is particularly preferred.

The elastomers may or may not further comprise repeating units derived from further olefins which are neither isoolefins nor multiolefins.

Examples of such suitable olefins include β-pinene, styrene, divinylbenzene, diisopropenylbenzene o-, m- and p-alkylstyrenes such as o-, m- and p-methyl-styrene.

The multiolefin content of elastomers produced according to the invention is typically 0.1 mol-% or more, preferably of from 0.1 mol-% to 15 mol-%, in another embodiment 0.5 mol-% or more, preferably of from 0.5 mol-% to 10 mol-%, in another embodiment 0.7 mol-% or more, preferably of from 0.7 to 8.5 mol-% in particular of from 0.8 to 1.5 or from 1.5 to 2.5 mol-% or of from 2.5 to 4.5 mol-% or from 4.5 to 8.5 mol-%, particularly where isobutene and isoprene are employed.

The term □multiolefin content□denotes the molar amount of repeating units derived from multiolefins with respect to all repeating units of the elastomer. The elastomer particles obtained according to the invention typically appear as a light and crumbly material.

In one embodiment the elastomer particles exhibit a bulk density of from 0.05 kg/l to 0.800 kg/l.

In a further step e) the elastomer particles obtained in step f) are subjected to a shaping process such as baling.

The invention therefore encompasses a shaped article in particular a bale obtainable by shaping, in particular baling the elastomer particles obtained in step e). Shaping can be performed using any standard equipment known to those skilled in the art for such purposes. Baling can e.g. performed with conventional, commercially available balers.

Shaped articles made from or comprising (reshaped) elastomer particles are also encompassed by the broader term elastomer compositions.

In one embodiment the shaped article in particular the bale exhibits a density of from 0.700 kg/l to 0.850 kg/l.

In another embodiment the shaped article is cuboid and has a weight of from 10 to 50 kg, preferably 25 to 40 kg.

It is apparent for those skilled in the art, that the density of the shaped article in particular the bale is higher than the bulk density of the elastomer particles employed for its production.

Blends

The elastomer compositions, in particular the elastomer particles, reshaped polymer particles and shaped articles made from or comprising (reshaped) elastomer particles are hereinafter referred to as the elastomer s according to the invention. One or more of the elastomer s according to the invention may be blended either with each other or additionally or alternatively with at least one secondary rubber, which is preferably selected from the group consisting of natural rubber (NR), epoxidized natural rubber (ENR), polyisoprene rubber, polyisobutylene rubber, poly(styrene-co-butadiene) rubber (SBR), chloroprene rubber (CR), polybutadiene rubber (BR), perfluoroelastomer (FFKM/FFPM), ethylene vinylacetate (EVA) rubber, ethylene acrylate rubber, polysulphide rubber (TR), poly(isoprene-co-butadiene) rubber (IBR), styrene-isoprene-butadiene rubber (SIBR), ethylene-propylene rubber (EPR), ethylene-propylene-diene M-class rubber (EPDM), polyphenylensulfide, nitrile-butadiene rubber (NBR), hydrogenated nitrile-butadiene rubber (HNBR), propylene oxide polymers, star-branched butyl rubber and halogenated star-branched butyl rubber, butyl rubbers which are not subject of the present invention i.e. having i.a. different levels of multivalent metal ions or purity grages, brominated butyl rubber and chlorinated butyl rubber, star-branched polyisobutylene rubber, star-branched brominated butyl (polyisobutylene/isoprene elastomer) rubber; poly(isobutylene-co-p-methylstyrene) and halogenated poly(isobutylene-co-p-methylstyrene), halogenated poly (isobutylene-co-isoprene-co-p-methylstyrene), poly(isobutylene-co-isoprene-co-styrene), halogenated poly(isobutylene-co-isoprene-co-styrene), poly(isobutylene-co-isoprene-co-alpha-methylstyrene), halogenated poly(isobutylene-co-isoprene-co-a-methylstyrene).

One or more of the elastomers according to the invention or the blends with secondary rubbers described above may be further blended additionally or alternatively for example simultaneously or separately with at least one thermoplastic polymer, which is preferably selected from the group consisting of polyurethane (PU), polyacrylic esters (ACM, PMMA), thermoplastic polyester urethane (AU), thermoplastic polyether urethane (EU), perfluoroalkoxyalkane (PFA), polytetrafluoroethylene (PTFE), and polytetrafluoroethylene (PTFE).

One or more of the elastomers according to the invention or the blends with secondary rubbers and/or thermoplastic polymers described above may be compounded with one or more fillers. The fillers may be non-mineral fillers, mineral fillers or mixtures thereof. Non-mineral fillers are preferred in some embodiments and include, for example, carbon blacks, rubber gels and mixtures thereof. Suitable carbon blacks are preferably prepared by lamp black, furnace black or gas black processes. Carbon blacks preferably have BET specific surface areas of 20 to 200 $m^2/g$. Some specific examples of carbon blacks are SAF, ISAF, HAF, FEF and GPF carbon blacks. Rubber gels are preferably those based on polybutadiene, butadiene/styrene elastomers, butadiene/acrylonitrile elastomers or polychloroprene.

Suitable mineral fillers comprise, for example, silica, silicates, clay, bentonite, vermiculite, nontronite, beidelite, volkonskoite, hectorite, saponite, laponite, sauconite, magadiite, kenyaite, ledikite, gypsum, alumina, talc, glass, metal oxides (e.g. titanium dioxide, zinc oxide, magnesium oxide, aluminum oxide), metal carbonates (e.g. magnesium carbonate, calcium carbonate, zinc carbonate), metal hydroxides (e.g. aluminum hydroxide, magnesium hydroxide) or mixtures thereof.

Dried amorphous silica particles suitable for use as mineral fillers may have a mean agglomerate particle size in the range of from 1 to 100 microns, or 10 to 50 microns, or 10 to 25 microns. In one embodiment, less than 10 percent by volume of the agglomerate particles may be below 5 microns. In one embodiment, less than 10 percent by volume of the agglomerate particles may be over 50 microns in size. Suitable amorphous dried silica may have, for example, a BET surface area, measured in accordance with DIN (Deutsche Industrie Norm) 66131, of between 50 and 450 square meters per gram. DBP absorption, as measured in accordance with DIN 53601, may be between 150 and 400 grams per 100 grams of silica. A drying loss, as measured according to DIN ISO 787/11, may be from 0 to 10 percent by weight.

Suitable silica fillers are commercially sold under the names HiSil□ 210, HiSil□ 233 and HiSil□ 243 available from PPG Industries Inc. Also suitable are Vulkasil□ S and Vulkasil□ N, commercially available from Bayer AG.

High aspect ratio fillers useful in the present invention may include clays, talcs, micas, etc. with an aspect ratio of at least 1:3. The fillers may include a circular or nonisometric materials with a platy or needle-like structure. The aspect ratio is defined as the ratio of mean diameter of a circle of the same area as the face of the plate to the mean thickness of the plate. The aspect ratio for needle and fiber shaped fillers is the ratio of length to diameter. The high aspect ratio fillers may have an aspect ratio of at least 1:5, or at least 1:7, or in a range of 1:7 to 1:200. High aspect ratio fillers may have, for example, a mean particle size in the range of from 0.001 to 100 microns, or 0.005 to 50 microns, or 0.01 to 10 microns. Suitable high aspect ratio fillers may have a BET surface area, measured in accordance with DIN (Deutsche Industrie Norm) 66131, of between 5 and 200 square meters per gram. The high aspect ratio filler may comprise a nanoclay, such as, for example, an organically modified nanoclay. Examples of nanoclays include natural powdered smectite clays (e.g. sodium or calcium montmorillonite) or synthetic clays (e.g. hydrotalcite or laponite). In one embodiment, the high aspect filler may include organically modified montmorillonite nanoclays. The clays may be modified by substitution of the transition metal for an onium ion, as is known in the art, to provide surfactant functionality to the clay that aids in the dispersion of the clay within the generally hydrophobic polymer environment. In one embodiment, onium ions are phosphorus based (e.g. phosphonium ions) or nitrogen based (e.g. ammonium ions) and contain functional groups having from 2 to 20 carbon atoms. The clays may be provided, for example, in nanometer scale particle sizes, such as, less than 25 µm by volume. The particle size may be in a range of from 1 to 50 µm, or 1 to 30 µm, or 2 to 20 µm. In addition to silica, the nanoclays may also contain some fraction of alumina. For example, the nanoclays may contain from 0.1 to 10 Wt.-% alumina, or 0.5 to 5 Wt.-% alumina, or 1 to 3 Wt.-% alumina. Examples of commercially available organically modified nanoclays as high aspect ratio mineral fillers include, for example, those sold under the trade name Cloisite☐ clays 10A, 20A, 6A, 15A, 30B, or 25A.

One or more of the elastomers according to the invention or the blends with secondary rubbers and/or thermoplastic polymers or the compounds described above are hereinafter collectively referred to as polymer products and may further contain other ingredients such as curing agents, reaction accelerators, vulcanizing accelerators, vulcanizing acceleration auxiliaries, antioxidants, foaming agents, anti-aging agents, heat stabilizers, light stabilizers, ozone stabilizers, processing aids, plasticizers, tackifiers, blowing agents, dyestuffs, pigments, waxes, extenders, organic acids, inhibitors, metal oxides, and activators such as triethanolamine, polyethylene glycol, hexanetriol, etc., which are known to the rubber industry. These ingredients are used in conventional amounts that depend, inter alia, on the intended use.

It was found that the elastomer s according to the invention are particularly useful for the preparation of compounds for specific applications.

In one embodiment the invention encompasses sealants in particular window sealants comprising the elastomer s according to the invention.

Insulated glass units are exposed to various loads by opening and closing, by wind, and changes in temperature. The ability of the sealants to accommodate those deformations under the additional exposure to humidity, UV radiation, and heat determines the service life of the insulated glass unit. Another critical performance requirement for insulated glass manufacturers is avoidance of the phenomena called chemical fogging. Testing may be for example conducted in accordance to ASTM E 2189. Chemical fogging is an unsightly accumulation of volatile organic chemicals that deposit on interior surfaces of the glass sheets over time. Such fogging can be caused by volatiles from the sealants and therefore window sealant formulations must contain ingredients that do not cause fogging inside the unit. It was found that fogging can be significantly reduced or even avoided for sealants comprising the elastomer s. Specifically the invention encompasses sealants, in particular window sealants comprising a elastomer according to the invention in an amount of from 0.1 to 60 wt.-%, preferably of from 0.5 to 40 wt.-%, more preferably of from 5 to 30 wt.-% and more preferably of from 15 to 30 wt.-%, whereby the sealant in particular the window sealant comprises a ratio of elastomer to carboxylic acid salts of mono- and multivalent metal ions of at least 250:1, preferably at least 500:1, more preferably at least 1000:1 any yet even more preferably at least 2000:1. Such ratios are not achievable using conventional manufacturing methods for elastomer s.

The sealants, in particular the window sealants further contain:
  at least one filler as defined above and/or
  at least one secondary rubber and/or non-crystalline thermoplastic polymers and/or
  at least one anti-oxidant as defined above and/or
  at least one hydrocarbon resin and/or Preferred fillers for sealants, in particular window sealants are selected from the group consisting of carbon black and reinforcing colourless or white fillers, preferably calcium carbonate, calcium sulfate, aluminium silicates, clays such as kaolin clay, titanium dioxide, mica, talc and silica, whereby calcium carbonate and is particularly preferred. Preferred secondary rubbers for sealants, in particular window sealants are selected from the group consisting of those listed above.

Preferred anti-oxidants for sealants, in particular window sealants are selected from the group consisting of those listed above, whereby those having a molecular weight of at least 500, such as Irganox ☐ 1010, are preferred.

The term "hydrocarbon resin" as used herein is known to those skilled in art and refers to a compound which is solid at 23° C. unlike liquid plasticizer compounds such as oils. Hydrocarbon resins are polymers are typically based on carbon and hydrogen, which can be used in particular as plasticizers or tackifiers in polymeric matrices. They have been described for example in the work entitled "Hydrocarbon Resins" by R. Mildenberg, M. Zander and G. Collin (New York, V C H, 1997, ISBN 3-527-28617-9), Chapter 5 of which is devoted to their applications.

They may be aliphatic, cycloaliphatic, aromatic, hydrogenated aromatic. They may be natural or synthetic, whether or not based on petroleum (if such is the case, they are also known as petroleum resins).

Their glass transition temperature (Tg) is preferably above 0° C., preferably above 50° C., more preferably above between 50° C. and 150° C., even more preferably between 80 and 120° C.

Hydrocarbon resins may also be termed thermoplastic resins in the sense that they soften when heated and may thus be moulded. They may also be defined by a softening point or temperature, at which temperature the product, for example in powder form, becomes glutinous. This softening point tends to replace the melting point, which is quite poorly defined, of resins in general.

Preferred hydrocarbon resins exhibit a softening point of above 50° C., preferably between 50 to 150° C., more preferably between 80 to 120° C.

In a preferred embodiment of the invention, the hydrocarbon resin has at least any one of, and more preferably all of the following characteristics:
i) a Tg above between 50 and 150° C.
ii) a softening point between 50 and 150° C.
iii) a number-average molecular weight (Mn) of between 400 and 2000 g/mol
iv) a polydispersity index of less than 3.

The Tg is measured according to the ASTM D3418 (1999) standard. The softening point is measured according to the ISO 4625 standard ("Ring and Ball" method). The macrostructure (Mw, Mn and polydispersity index) is determined by steric exclusion chromatography (SEC): tetrahydrofuran solvent at 35° C., in a concentration of 1 g/l concentration; 1 ml/min flow rate; solution filtered on a filter of 0.45 micrometer porosity before injection; Moore calibration using polystyrene; set of three WATERS columns in series ("STYRAGEL" HR4E, HR1 and HR0.5); differential refractometer (WATERS 2410) detection and its associated operating software (WATERS EMPOWER).

Examples of suitable hydrocarbon resins include cyclopentadiene (abbreviated to CPD) or dicyclopentadiene (abbreviated to DCPD) homopolymer or copolymer resins, terpene homopolymer or copolymer resins, C5-cut homopolymer or copolymer resins, and blends of these resins.

Suitable commercially available hydrocarbon resins include, e.g., partially hydrogenated cycloaliphatic petroleum hydrocarbon resins available under the EASTOTAC series of trade designations including, e.g., EASTOTAC H-100, H-115, H-130 and H-142 from Eastman Chemical Co. (Kingsport, Tenn.) available in grades E, R, L and W, which have differing levels of hydrogenation from least hydrogenated (E) to most hydrogenated (W), the ESCOREZ series of trade designations including, e.g., ESCOREZ 1310, ESCOREZ 5300 and ESCOREZ 5400 from Exxon Chemical Co. (Houston, Tex.), and the HERCOLITE 2100 trade designation from Hercules (Wilmington, Del.); partially hydrogenated aromatic modified petroleum hydrocarbon resins available under the ESCOREZ 5600 trade designation from Exxon Chemical Co.; aliphatic-aromatic petroleum hydrocarbon resins available under the WINGTACK EXTRA trade designation from Goodyear Chemical Co. (Akron, Ohio); styrenated terpene resins made from d-limonene available under the ZONATAC 105 LITE trade designation from Arizona Chemical Co. (Panama City, Fla.); aromatic hydrogenated hydrocarbon resins available under the REGALREZ 1094 trade designation from Hercules; and alphamethyl styrene resins available under the trade designations KRISTALEX 3070, 3085 and 3100, which have softening points of 70° C., 85° C. and 100° C., respectively, from Hercules.

The term □non-crystalline thermoplastic□includes amorphous polypropylene, ethylene-propylene copolymer and butene-propylene copolymers;

In one embodiment the sealants in particular the window sealants according to the invention comprise
from 0.1 to 60 wt.-%, preferably of from 0.5 to 40 wt.-%, more preferably of from 5 to 30 wt.-% and more preferably of from 15 to 30 wt.-% of at least one elastomer according to the invention,
from 0.1 to 40 wt.-%, preferably of from 10 to 30 wt.-%, more preferably of from 10 to 25 wt.-% of at least one filler
from 0.1 to 30 wt.-%, preferably of from 10 to 30 wt.-%, more preferably of from 15 to 25 wt.-% of at least one secondary rubber
from 0.01 to 2 wt.-%, preferably of from 0.1 to 1 wt.-%, more preferably of from 0.1 to 0.8 wt.-% of at least one anti-oxidant
zero, or from 0.01 to 30 wt.-%, preferably of from 10 to 30 wt.-%, more preferably of from 15 to 25 wt.-% of at least one non-crystalline thermoplastic
whereby the sealant in particular the window sealant comprises a ratio of elastomer to carboxylic acid salts of monomultivalent metal ions of at least 250:1, preferably at least 500:1, more preferably at least 1000:1 any yet even more preferably at least 2000:1 and
whereby the aforementioned components are selected such that they add up to 80 to 100% of the total weight of the sealant or the window sealant, preferably to 80 to 100 wt.-% and more preferably to 95 to 100 wt.-%.

The remainder to 100 wt.-% may include other additives including thermal stabilizers, light stabilizers (e.g., UV light stabilizers and absorbers), optical brighteners, antistats, lubricants, antioxidants, catalysts, rheology modifiers, biocides, corrosion inhibitors, dehydrators, organic solvents, colorants (e.g., pigments and dyes), antiblocking agents, nucleating agents, flame retardants and combinations thereof. The type and amount of other additives is selected to minimize the present of moisture that can prematurely initiate cure of the sealant.

Since the sealants, in particular the window sealants according to the invention exhibit unique fogging behaviour combined with very good barrier properties sealed articles in particular windows comprising the aforementioned sealants or window sealants are encompassed by the invention as well.

Further polymer products may further contain a curing system which allows them to be cured.

The choice of curing system suitable for use is not particularly restricted and is within the purview of a person skilled in the art. In certain embodiments, the curing system may be sulphur-based, peroxide-based, resin-based or ultraviolet (UV) light-based.

sulfur-based curing system may comprise: (i) at least one metal oxide which is optional, (ii) elemental sulfur and (iii) at least one sulfur-based accelerator. The use of metal oxides as a component in the sulphur curing system is well known in the art and preferred.

A suitable metal oxide is zinc oxide, which may be used in the amount of from about 1 to about 10 phr. In another embodiment, the zinc oxide may be used in an amount of from about 2 to about 5 phr.

Elemental sulfur, is typically used in amounts of from about 0.2 to about 2 phr.

Suitable sulfur-based accelerators may be used in amounts of from about 0.5 to about 3 phr.

Non-limiting examples of useful sulfur-based accelerators include thiuram sulfides (e.g. tetramethyl thiuram disulfide (TMTD)), thiocarbamates (e.g. zinc dimethyl dithiocarbamate (ZDMC), zinc dibutyl dithiocarbamate (ZDBC), zinc dibenzyldithiocarbamate (ZBEC) and thiazyl or benzothiazyl compounds (e.g. 4-morpholinyl-2-benzothizyl disulfide (Morfax), mercaptobenzothiazol (MBT) and mercaptobenzothiazyl disulfide (MBTS)). A sulphur based accelerator of particular note is mercaptobenzothiazyl disulfide.

Depending on the specific nature an in particular the level of unsaturation of the elastomers according to the invention peroxide based curing systems may also be suitable. A peroxide-based curing system may comprises a peroxide curing agent, for example, dicumyl peroxide, di-tert-butyl peroxide, benzoyl peroxide, 2,2□bis(tert.-butylperoxy diisopropylbenzene (Vulcup□ 40KE), benzoyl peroxide, 2,5-dimethyl-2,5-di(tert-butylperoxy)-hexyne-3, 2,5-dimethyl-2,5-di(benzoylperoxy)hexane, (2,5-bis(tert-butylperoxy)-2,5-dimethyl hexane and the like. One such peroxide curing agent comprises dicumyl peroxide and is commercially available under the name DiCup 40C. Peroxide curing agents may be used in an amount of about 0.2-7 phr, or about 1-6 phr, or about 4 phr. Peroxide curing co-agents may also be used. Suitable peroxide curing co-agents include, for example, triallyl isocyanurate (TAIC) commercially available under the name DIAK 7 from DuPont, N,N□m-phenylene dimaleimide known as HVA-2 from DuPont or Dow), triallyl cyanurate (TAC) or liquid polybutadiene known as Ricon D 153 (supplied by Ricon Resins). Peroxide curing co-agents may be used in amounts equivalent to those of the peroxide curing agent, or less. The state of peroxide cured articles is enhanced with butyl polymers comprising increased levels of unsaturation, for example a multiolefin content of at least 0.5 mol-%.

The polymer products may also be cured by the resin cure system and, if required, an accelerator to activate the resin cure. Suitable resins include but are not limited to phenolic resins, alkylphenolic resins, alkylated phenols, halogenated alkyl phenolic resins and mixtures thereof. The selection of the various components of the resin curing system and the required amounts are known to persons skilled in the art and depend upon the desired end use of the rubber compound. The resin cure as used in the vulcanization of elastomers comprising unsaturation, and in particular for butyl rubber is described in detail in "Rubber Technology" Third Edition, Maurice Morton, ed., 1987, pages 13-14, 23, as well as in the patent literature, see, e.g., U.S. Pat. Nos. 3,287,440 and 4,059,651.

When used for curing butyl rubber, a halogen activator is occasionally used to effect the formation of crosslinks. Such activators include stannous chloride or halogen-containing polymers such as polychloroprene. The resin cure system additionally typically includes a metal oxide such as zinc oxide.

Halogenated resins in which some of the hydroxyl groups of the methylol group are replaced with, e.g., bromine, are more reactive. With such resins the use of additional halogen activator is not required.

Illustrative of the halogenated phenol aldehyde resins are those prepared by Schenectady Chemicals, Inc. and identified as resins SP 1055 and SP 1056. The SP 1055 resin has a methylol content of about 9 to about 12.5% and a bromine content of about 4%. whereas the SP 1056 resin has a methylol content of about 7.5 to about 11% and a bromine content of about 6%. Commercial forms of the nonhalogenated resins are available such as SP-1044 with a methylol content of about 7 to about 9.5% and SP-1045 with a methylol content of about 8 to about 11%.

To the extent the polymer products disclosed above whether uncure or cured exhibit the levels of salts of multivalent metal ions, in particular the levels of stearates and palmitates of multivalent metal ions with respect to their contents of the elastomers according to the invention there are as such novel and consequently encompassed by the invention as well.

The invention further encompasses the use of the elastomers according to the invention to prepare the polymer products described above and a process for the preparation of the polymer products described above by blending or compounding the ingredients mentioned above.

Such ingredients may be compounded together using conventional compounding techniques. Suitable compounding techniques include, for example, mixing the ingredients together using, for example, an internal mixer (e.g. a Banbury mixer), a miniature internal mixer (e.g. a Haake or Brabender mixer) or a two roll mill mixer. An extruder also provides good mixing, and permits shorter mixing times. It is possible to carry out the mixing in two or more stages, and the mixing can be done in different apparatuses, for example one stage in an internal mixer and one stage in an extruder. For further information on compounding techniques, see Encyclopedia of Polymer Science and Engineering, Vol. 4, p. 66 et seq. (Compounding). Other techniques, as known to those of skill in the art, are further suitable for compounding.

It was surprisingly found that the elastomers according to the invention due to their low stearate concentration allow much better curing, in particular when resin cured as will be shown in the experimental part.

Applications

The polymer products according to the invention are highly useful in wide variety of applications. The low degree of permeability to gases, the unsaturation sites which may serve as crosslinking, curing or post polymerization modification site as well as their low degree of disturbing additives accounts for the largest uses of these rubbers.

Therefore, the invention also encompasses the use of the polymer products according to the invention for innerliners, bladders, tubes, air cushions, pneumatic springs, air bellows, accumulator bags, hoses, conveyor belts and pharmaceutical closures. The invention further encompasses the aforementioned products comprising the polymer products according to the invention whether cured or/uncured.

The polymer products further exhibit high damping and have uniquely broad damping and shock absorption ranges in both temperature and frequency.

Therefore, the invention also encompasses the use of the polymer products according to the invention in automobile suspension bumpers, auto exhaust hangers, body mounts and shoe soles.

The polymer products of the instant invention are also useful in tire sidewalls and tread compounds. In sidewalls, the polymer characteristics impart good ozone resistance, crack cut growth, and appearance.

The polymer products may be shaped into a desired article prior to curing. Articles comprising the cured polymer products include, for example, belts, hoses, shoe soles, gaskets, o-rings, wires/cables, membranes, rollers, bladders (e.g. curing bladders), inner liners of tires, tire treads, shock absorbers, machinery mountings, balloons, balls, golf balls, protective clothing, medical tubing, storage tank linings, power belts, electrical insulation, bearings, pharmaceutical stoppers, adhesives, a container, such as a bottle, tote, storage tank, etc.; a container closure or lid; a seal or sealant, such as a gasket or caulking; a material handling apparatus, such as an auger or conveyor belt; a cooling tower; a metal working apparatus, or any apparatus in contact with metal working fluids; an engine component, such as fuel lines, fuel filters, fuel storage tanks, gaskets, seals, etc.; a membrane, for fluid filtration or tank sealing.

Additional examples where the polymer products may be used in articles or coatings include, but are not limited to, the following: appliances, baby products, bathroom fixtures, bathroom safety, flooring, food storage, garden, kitchen fixtures, kitchen products, office products, pet products, sealants and grouts, spas, water filtration and storage, equipment, food preparation surfaces and equipments, shopping carts, surface applications, storage containers, footwear, protective wear, sporting gear, carts, dental equipment, door knobs, clothing, telephones, toys, catheterized fluids in hospitals, surfaces of vessels and pipes, coatings, food processing, biomedical devices, filters, additives, computers, ship hulls, shower walls, tubing to minimize the problems of biofouling, pacemakers, implants, wound dressing, medical textiles, ice machines, water coolers, fruit juice dispensers, soft drink machines, piping, storage vessels, metering systems, valves, fittings, attachments, filter housings, linings, and barrier coatings.

In a preferred specific embodiment 1, the invention relates to a process for the preparation of an aqueous slurry comprising a plurality of elastomer particles suspended therein, the process comprising at least the step of:
A*) contacting an organic medium comprising
i) at least one elastomer and
ii) an organic diluent
with an aqueous medium comprising at least one LCST compound having a cloud point of 0 to 100° C., preferably 5 to 100° C., more preferably 15 to 80° C. and even more preferably 20 to 70° C.
and
removing at least partially the organic diluent to obtain the aqueous slurry comprising the elastomer particles.

In a specific embodiment 2 according to specific embodiment 1 the elastomers are selected from the group consisting of butyl rubbers and halogenated butyl rubbers, polyisobutylene, ethylene propylene diene M-class rubbers (EPDM), nitrile butadiene rubbers (NBR), hydrogenated nitrile butadiene rubbers (HNBR) and styrene-butadiene rubbers (SBR).

1. In a specific embodiment 3 according to specific embodiment 1 or 2 the organic medium comprising at least one elastomer and an organic diluent is obtained from a polymerization reaction or a post-polymerization reaction such as halogenation.

2. In a specific embodiment 4 according to one of specific embodiments 1 to 3 the organic medium is obtained from a polymerization reaction and further contains residual monomers of the polymerization reaction.

In a specific embodiment 5 according to one of specific embodiments 1 to 4 the aqueous medium contains of from 0 to 5,000 ppm, preferably of from 0 to 2,000 ppm, more preferably of from 10 to 1,000 ppm, even more preferably of from 50 to 800 ppm and yet even more preferably of from 100 to 600 ppm of salts of multivalent metal ions calculated on their metal content and with respect to the amount of copolymer present in the medium obtained according to step A).

In a specific embodiment 6 according to one of specific embodiments 1 to 4 the aqueous medium comprises 550 ppm or less, preferably 400 ppm or less, more preferably 300 ppm or less, even more preferably 250 ppm or less and yet even more preferably 150 ppm or less and in another yet even more preferred embodiment 100 ppm or less of carboxylic acid salts of multivalent metal ions calculated on their metal content and with respect to the amount of copolymer present in the medium obtained according to step b).

In a specific embodiment 7 according to specific embodiments 5 or 6 the salts of multivalent metal ions are calcium stearate and/or zinc stearate and/or calcium palmitate and/or zinc palmitate.

In a specific embodiment 8 according to specific embodiment 7 the carboxylic acid salts of multivalent metal ions are calcium stearate and/or zinc stearate and/or calcium palmitate and/or zinc palmitate.

In a specific embodiment 9 according to one of specific embodiments 1 to 8 the organic medium comprising at least one elastomer and an organic diluent is obtained from a polymerization reaction comprising at least the steps of:
a) providing a reaction medium comprising an organic diluent, and at least one polymerizable monomer
b) polymerizing the monomers within the reaction medium in the presence of an initiator system or catalyst to form an organic medium comprising the elastomer, the organic diluent and optionally residual monomers.

In a specific embodiment 10 according to one of specific embodiments 1 to 8 the organic medium comprising at least one elastomer and an organic diluent is obtained from a polymerization reaction comprising at least the steps of:
a) providing a reaction medium comprising an organic diluent, and at least two monomers whereby at least one monomer is an isoolefin and at least one monomer is a multiolefin;
b) polymerizing the monomers within the reaction medium in the presence of an initiator system to form an organic medium comprising the copolymer, the organic diluent and optionally residual monomers.

In a specific embodiment 11 according to one of specific embodiments 1 to 10 step A) is carried out batchwise or continuously, preferably continuously.

In a specific embodiment 12 according to one of specific embodiments 1 to lithe temperature in step A*) is from 10 to 100° C., preferably from 50 to 100° C., more preferably from 60 to 95° C. and even more preferably from 75 to 95° C.

In a specific embodiment 13 according to one of specific embodiments 1 to 12 the at least one LCST compound is selected from the group consisting of:
poly(N-isopropylacrylamide), poly(N-isopropylacrylamide-co-N,N-dimethylacrylamide, poly(N-isopropylacrylamide)-alt-2-hydroxyethylmethacrylate, poly(N-vinylcaprolactam), poly(N,N-diethylacrylamide), poly[2-(dimethylamino)ethyl methacrylate], poly(2-oxazoline) glyelastomers, Poly(3-ethyl-N-vinyl-2-pyrrolidone), hydroxylbutyl chitosan, polyoxyethylene (20) sorbitan monostearate, polyoxyethylene (20) sorbitan monolaurate, polyoxyethylene (20) sorbitan monooleate, methyl cellulose, hydroxypropyl cellulose, hydroxyethyl methylcellulose, hydroxypropyl methylcellulose, poly(ethylene glycol) methacrylates with 2 to 6 ethylene glycol units, polyethyleneglycol-co-polypropylene glycols, preferably those with 2 to 6 ethylene glycol units and 2 to 6 polypropylene units, compounds of formula (I)

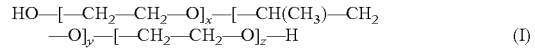

$$HO—[—CH_2—CH_2—O]_x—[—CH(CH_3)—CH_2—O]_y—[—CH_2—CH_2—O]_z—H \quad (I)$$

with y=3 to 10 and x and z=1 to 8, whereby y+x+z is from 5 to 18,
polyethyleneglycol-co-polypropylene glycol, preferably those with 2 to 8 ethylene glycol units and 2 to 8 polypropylene units, ethoxylated iso-$C_{13}H_{27}$-alcohols, preferably with an ethoxylation degree of 4 to 8, polyethylene glycol with 4 to 50, preferably 4 to 20 ethyleneglycol units, polypropylene glycol with 4 to 30, preferably 4 to 15 propyleneglycol units, polyethylene glycol monomethyl, dimethyl, monoethyl and diethyl ether with 4 to 50, preferably 4 to 20 ethyleneglycol units, polypropylene glycol monomethyl, dimethyl, monoethyl and diethyl ether with 4 to 50, preferably 4 to 20 propyleneglycol units, whereby methyl cellulose, hydroxypropyl cellulose, hydroxyethyl methylcellulose and hydroxypropyl methylcellulose are preferred.

In a specific embodiment 14 according to one of specific embodiments 1 to 13 the process comprises a further step wherein the elastomer particles contained in the aqueous slurry obtained according to step A*) are separated to obtain isolated elastomer particles.

In a specific embodiment 15 according to one of specific embodiments 1 to 13 the process comprises a further step wherein the elastomer particles contained in the aqueous slurry obtained according to step A*) are separated to obtain isolated elastomer particles and further step wherein the (isolated) elastomer particles are dried, preferably to a residual content of volatiles of 7,000 or less, preferably 5,000 or less, even more preferably 4,000 or less and in another embodiment 2,000 ppm or less, preferably 1,000 ppm or less.

In a specific embodiment 16 according to one of specific embodiments 1 to 15 the process comprises as a further step shaping of the elastomer particles to obtain reshaped elastomer particles such as pellets or shaped articles such as bales.

In a specific embodiment 17 the invention encompasses an aqueous slurry obtainable according to one of specific embodiments 1 to 16.

In a specific embodiment 18 the invention encompasses the use of LCST compounds having a cloud point of 0 to 100° C., preferably 5 to 100° C., more preferably 15 to 80° C. and even more preferably 20 to 70° C. as anti-agglomerant, in particular for elastomer particles.

In a specific embodiment 19 the invention encompasses a method to prevent or reduce or to slow-down agglomeration of slurries comprising elastomer particles suspended in aqueous media by addition or use of LCST compounds having a cloud point of 0 to 100° C., preferably 5 to 100° C., more preferably 15 to 80° C. and even more preferably 20 to 70° C.

In a specific embodiment 20 the invention encompasses elastomer particles having a elastomer content of 98.5 wt.-% or more, preferably 98.8 wt.-% or more, more preferably 99.0 wt.-% or more even more preferably 99.2 wt.-% or more, yet even more preferably 99.4 wt.-% or more and in another embodiment 99.5 wt.-% or more.

In a specific embodiment 21 according to specific embodiment 20 the elastomer has a weight average molecular weight in the range of from 10 to 2,000 kg/mol, preferably in the range of from 20 to 1,000 kg/mol, more preferably in the range of from 50 to 1,000 kg/mol, even more preferably in the range of from 200 to 800 kg/mol, yet more preferably in the range of from 375 to 550 kg/mol, and most preferably in the range of from 400 to 500 kg/mol.

In a specific embodiment 22 according to specific embodiments 20 or 21 the elastomer has a Mooney viscosity of at least 10 (ML 1+8 at 125° C., ASTM D 1646), preferably of from 20 to 80 and even more preferably of from 25 to 60 (ML 1+8 at 125° C., ASTM D 1646).

In a specific embodiment 23 according to one of specific embodiments 20 to 22 the elastomer particles further comprise 0 to 0.4 wt.-%, preferably 0 to 0.2 wt.-%, more preferably 0 to 0.1 wt.-% and more preferably 0 to 0.05 wt.-% of salts of multivalent metal ions, preferably stearates and palmitates of multivalent metal ions.

In a specific embodiment 24 according to one of specific embodiments 20 to 24 the elastomer particles further comprise 1 ppm to 18,000 ppm, preferably 1 ppm to 5,000 ppm, more preferably from 1 ppm to 2,000 ppm and in a more preferred embodiment from 5 to 1,000 ppm or from 5 to 500 ppm of at least one LCST compound.

In a specific embodiment 25 the invention encompasses a shaped article, in particular a pellet or bale obtainable by shaping elastomer particles according to specific embodiments 20 to 24.

In a specific embodiment 26 the invention encompasses blends or compounds obtainable by blending or compounding the elastomer particles according to specific embodiments 20 to 24 or the shaped articles of specific embodiment 25.

In a specific embodiment 27 the invention encompasses the use of the elastomer particles according to specific embodiments 20 to 24 or the shaped articles of specific embodiment 25 or the blends or compounds according to specific embodiment 26 for innerliners, bladders, tubes, air cushions, pneumatic springs, air bellows, accumulator bags, hoses, conveyor belts and pharmaceutical closures, automobile suspension bumpers, auto exhaust hangers, body mounts, shoe soles, tire sidewalls and tread compounds, belts, hoses, shoe soles, gaskets, o-rings, wires/cables, membranes, rollers, bladders (e.g. curing bladders), inner liners of tires, tire treads, shock absorbers, machinery mountings, balloons, balls, golf balls, protective clothing, medical tubing, storage tank linings, electrical insulation, bearings, pharmaceutical stoppers, adhesives, a container, such as a bottle, tote, storage tank, a container closure or lid; a seal or sealant, such as a gasket or caulking; a material handling apparatus, such as an auger or conveyor belt; a cooling tower; a metal working apparatus, or any apparatus in contact with metal working fluids; an engine component, such as fuel lines, fuel filters, fuel storage tanks, gaskets, seals, etc.; a membrane, for fluid filtration or tank sealing.

The invention also encompasses specific embodiments which are combinations of the 27 specific embodiments listed hereinabove with general embodiments, including any level of preferred embodiments, ranges parameters as disclosed above.

The invention is hereinafter further explained by the examples without being limited thereto.

EXPERIMENTAL SECTION

Examples 1 to 4a

Elastomer Particle Formation

In an experiment to demonstrate the ability of methyl cellulose to form an aqueous slurry the following experiments were carried out. Isoprene (0.41 g) and isobutylene (13.50 g) were combined with methyl chloride (200 g at −95° C. under an inert atmosphere. A solution of aluminium trichloride (3 g/l) as a lewis acid in methyl chloride (3 mL at −95° C.) was then added with agitation to the reaction mixture to initiate polymerization. Residual traces of water of around 25 ppm within the organic diluent served as initiator. This reaction produced 10 g of butyl rubber with an isoprene level of 2 mol-% in form of finely dispersed particles in methyl chloride and comprising no anti-agglomerants of any kind.

The resulting mixture was then poured into a 2 L vessel comprising 1 L of water as the aqueous medium and maintained at 85° C. agitated with an impeller at 1000 RPM. The hot water caused the flashing of diluent and residual monomers, leaving behind the elastomer and an aqueous phase. The polymerization/stripping experiment was repeated with different levels of anti-agglomerant present in the water prior to the addition of the reaction mixture to form different aqueous media. The key observation was whether the elastomer in the aqueous phase was obtained in form of an aqueous slurry (as required by the invention) or in form of a single mass (table 1).

TABLE 1

Results of elastomer formation experiments

| No. | Additive | Concentration (w/w elastomer) | Form of elastomer |
|---|---|---|---|
| 1 (blind test) | None | n.a. | Single mass |
| 2 (for comp.) | Calcium stearate | 0.50 wt.-% (50 mg, 330 ppm metal) | Single mass |
| 3 (state of the art) | Calcium stearate | 1.00 wt.-% (100 mg, 660 ppm metal) | Aqueous slurry of distinct particles |
| 4a (inventive) | Methyl cellulose | 0.10 wt.-% (10 mg, 0 ppm metal) | Aqueous slurry of distinct particles |
| 4b (inventive) | Methyl cellulose | 0.15 wt.-% (15 mg, 0 ppm metal) | Aqueous slurry of distinct particles |
| 4c (inventive) | Methyl cellulose | 0.05 wt.-% (5 mg, 0 ppm metal) | Aqueous slurry of distinct particles |

The methyl cellulose employed was methyl cellulose type M 0512 purchased by Sigma Aldrich having a viscosity of 4000 cp at 2 wt.-% in water and 20° C. and a molecular weight of 88,000, a degree of substitution of from 1.5 to 1.9 and methoxy substitution of 27.5 to 31.5 wt.-%.

These experiments demonstrate that methyl cellulose is an improved agent for the formation of an aqueous slurry comprising elastomer particles slurry, being effective at levels substantially below the required dosages for calcium stearate. After addition ceased, both experiments which formed elastomer particles were sufficiently non-agglomerative to avoid agglomerating into a single mass for more than 1 h.

Examples 4d) and 4e)

Continuous Elastomer Particle Formation

Isobutylene and isoprene were combined with methyl chloride to prepare a polymerization feedstock such that the total concentration of the monomers was from approximately 10-40 wt.-%. This feedstock stream was cooled to approximately −100° C. and was fed continuously into an agitated reaction vessel, also maintained at −100° C. In the reaction vessel the feedstock was mixed with a continuously added the initiator system stream, a solution of 0.05-0.5 wt.-% aluminium trichloride in methyl chloride as diluent which is typically activated by traces of water from the diluent. The addition rates of the feedstock stream and the initiator system stream were adjusted to provide an isobutylene isoprene elastomer with a mooney viscosity of approximately 34 and an unsaturation level of approximately 1 mol-%. Typically, the wt.-ratio of monomers in the feedstream to aluminum trichloride was held within a range of 500 to 10000, preferably 500 to 5000. Within the agitated reaction vessel the elastomer was obtained in the form of a finely divided slurry suspended in methyl chloride.

The reaction vessel was set up and operated such that the continuous addition of feedstock exceeds the volume of the reactor. When this volume was exceeded, the well mixed reaction slurry comprising methyl chloride, unreacted monomers and elastomer was allowed to overflow into another agitated vessel comprising water heated from 65 to 100° C. and employed in an amount of 12:1 by weight in relation to the elastomer. Thereby the vast majority of the diluent methylchloride was removed from the slurry.

The aqueous phase further contained of from 100 to 500 ppm of Irganox ☐ 1010 with respect to the elastomer.

If a suitable anti-agglomerant was added, this allowed for the formation of an aqueous slurry of isobutylene isoprene elastomer particles, whereby the concentration of elastomer particles in the aqueous slurry increased as the polymerization proceeded. The aqueous slurry was then dewatered and dried using conventional means to provide a elastomer suitable for testing and analysis.

It was demonstrated using this continuous process that it was possible to continuously form isoprene isobutylene elastomer particles using from 0.5 to 1.2 wt % calcium stearate (with respect to the elastomer) in a manner which is consistent with prior art (example 4d). It was further demonstrated that comparable elastomer particles (and resulting aqueous slurry) could also be obtained by removing calcium stearate and instead substituting it by any value of from 50☐500 ppm with respect to the elastomer of methyl cellulose (example 4e). Higher or lower values were not tested in this experiment, however the adhesive behaviour of the elastomer crumbs formed at a level of 50 ppm indicated that lower levels of methylcellulose can be successfully employed as well.

The methyl cellulose employed had a solution viscosity at 2 wt.-% solution of 4700 cps, molecular weight Mw of ~90,000, a methoxy substitution of 30.3 wt.-% and thus a degree of substitution of around 1.9.

The cloud point was 39.2° C., determined according to method 5: DIN EN 1890 of September 2006, method A wherein the amount of compound tested is reduced from 1 g per 100 ml of distilled water to 0.2 g per 100 ml of distilled water.

Using the experimental setup, described before two products were obtained after separating the particles from the aqueous slurry and drying. In order to add non-water soluble components such as antioxidant and calcium stearate in an liquid dispersion, these products contain small amounts of non-ionic surfactants. In the case of example 4d) where antioxidant and calcium stearate were employed the non-ionic surfactant level resulting thereof in the elastomer was <0.02 wt.-%; in the case of example 4e) where only antioxidant and no calcium stearate was employed the resulting non-ionic surfactant level in the rubber is <0.001 wt.-%.

The analytical data is set forth below:

Generally, if not mentioned otherwise, all analytical data was obtained according to the procedures set forth in the description hereinabove.

Molecular weights and polydispersity were determined by gel permeation chromatography in tetrahydrofurane and reported in kg mol$^{-1}$. The content of sterically hindered phenolic anti-oxidant (Irganox ☐ 1010) was determined by HPLC, results are reported in wt. %. Total unsaturation and microstructure were determined of respective signals from $^1$H NMR spectra of the elastomers and are reported in mol %.

Example 4d

Total unsaturation: 0.9 mol-%
Mw: 436,000
Polydispersity (Mw/Mn): 3.28
Mooney viscosity (ML 1+8 at 125° C., ASTM D 1646): 34
Calcium stearate content: 0.73 wt.-% (GC-FID, FTIR)
Irganox ☐ 1010: 0.035 wt.-%
Volatiles: 0.09 wt.-%

Other antiagglomerants, surfactants, emulsifiers: see above
Ions: (ICP-AES)
Aluminum (from catalyst): 70 ppm
Magnesium: 32 ppm
Other multivalent metal ions (Mn, Pb, Cu, Cr, Ba, Fe, Zn): 4 ppm
Monovalent metal ions (Na, K): 22 ppm Example 4e Total unsaturation: 0.9 mol-%
Mw: 420,000
Polydispersity (Mw/Mn): 3.26
Mooney viscosity (ML 1+8 at 125° C., ASTM D 1646): 34
Calcium stearate content: below detectable limits
Methyl cellulose content: 0.004 wt.-%
Irganox □ 1010: 0.02 wt.-%
Volatiles: 0.23 wt.-%
Other antiagglomerants, surfactants, emulsifiers: see above
Ions: (ICP-AES)
Aluminum (from catalyst): 70 ppm
Magnesium: 28 ppm
Other multivalent metal ions (Mn, Pb, Cu, Cr, Ba, Fe, Zn): 4 ppm
Monovalent metal ions (Na, K): 21 ppm
Thus the elastomer particles according to example 4e comprised
I) 100 parts by weight of a elastomer (100 phr)
II) 0.004 phr of a least one LCST compound and
III) less than 0.001 phr of non-LCST compounds selected from the group consisting of ionic or non-ionic surfactants, emulsifiers, and antiagglomerants and
IV) 0.02 phr of antioxidants
V) 0.23 phr of volatiles having a boiling point at standard pressure of 200° C. or less whereby these components made up more than 99.90 wt-% of the total weight of the elastomer particles.

Examples 4f) and 4g)

Continuous Elastomer Particle Formation II

Isobutylene and isoprene were combined with methyl chloride to prepare a polymerization feedstock such that the total concentration of the monomers was from approximately 10-40 wt.-%. This feedstock stream was cooled to approximately −100° C. and was fed continuously into an agitated reaction vessel, also maintained at −100° C. In the reaction vessel the feedstock was mixed with a continuously added initiator system stream, a solution of 0.05-0.5 wt.-% aluminium trichloride in methyl chloride which is typically activated by water in a molar ratio of from 0.1:1 to 1:1 water:aluminum trichloride. The addition rates of the feedstock stream and the initiator system stream were adjusted to provide an isobutylene isoprene elastomer with a mooney viscosity of approximately 51 and an unsaturation level of approximately from 1.4 mol-% to 1.8 mol %. Typically, the wt.-ratio of monomers in the feedstream to aluminum trichloride is held within a range of 500 to 10000, preferably 500 to 5000. Within the agitated reaction vessel the elastomer was obtained in the form of a finely divided slurry suspended in methyl chloride.

The reaction vessel was set up and operated such that the continuous addition of feedstock exceeds the volume of the reactor. When this volume was exceeded, the well mixed reaction slurry containing methyl chloride, unreacted monomers and elastomer was allowed to overflow into another agitated vessel containing water heated from 65 to 100° C. and employed in an amount of 12:1 by weight in relation to the elastomer. Thereby the vast majority of the diluent methylchloride was removed from the slurry.

After stripping steps, but before dewatering, Irganox □ 1010 was added to the aqueous phase in amounts from 100 to 500 ppm of with respect to rubber.

If a suitable anti-agglomerant was added, this allowed for the formation of an aqueous slurry of isobutylene isoprene elastomer particles, whereby the concentration of elastomer particles in the aqueous slurry increased as the polymerization proceeded. The aqueous slurry was then dewatered and dried using conventional means to provide a elastomer suitable for testing and analysis.

It was demonstrated using this continuous process that it was possible to continuously form isoprene isobutylene elastomer particles using from 0.4 to 1.2 wt % calcium stearate (with respect to the elastomer) in a manner which is consistent with prior art (example 4f). It was further demonstrated that comparable elastomer particles (and resulting aqueous slurry) could also be obtained by removing calcium stearate and instead substituting it by any value of from 50□500 ppm with respect to the elastomer of methyl cellulose (example 4g). Higher or lower values were not tested in this experiment, however the adhesive behaviour of the elastomer crumbs formed at a level of 50 ppm indicated that lower levels of methylcellulose can be successfully employed as well.

The methyl cellulose employed had a solution viscosity at 2 wt.-% solution of 3000-5600 cps, molecular weight Mw of ~90,000, a methoxy substitution of 27.5□31.5 wt.-% and thus a degree of substitution of around 1.9. The cloud point was 39.20, determined according to method 5: DIN EN 1890 of September 2006, method A wherein the amount of compound tested is reduced from 1 g per 100 ml of distilled water to 0.2 g per 100 ml of distilled water.

Using the experimental setup, described before two products were obtained after separating the particles from the aqueous slurry and drying. In order to add non-water soluble components such as antioxidant and calcium stearate in an liquid dispersion, these products contain small amounts of non-ionic surfactants. In the case of example 4f) where antioxidant and calcium stearate were employed the non-ionic surfactant level resulting thereof in the elastomer was <0.02 wt.-%; in the case of example 4g) no surfactants were employed.

The analytical data is set forth below:

Example 4f

Total unsaturation: 1.8 mol-%
Mw: 616000
Polydispersity (Mw/Mn): 3.54
Mooney viscosity (ML 1+8 at 125° C., ASTM D 1646): 51
Calcium stearate content: 0.68 wt.-% (GC-FID, FTIR)
Irganox □ 1010: 0.03 wt.-%
Volatiles: 0.15 wt.-%
Other antiagglomerants, surfactants, emulsifiers: see above
Ions: (ICP-AES)
Aluminum (from catalyst): 52 ppm
Magnesium: 8 ppm Other multivalent metal ions (Mn, Pb, Cu, Cr, Ba, Fe, Zn): 18 ppm
Monovalent metal ions (Na, K): 30 ppm
Ash: 0.081 wt % (ASTM D5667)

Example 4g

Total unsaturation: 1.41 mol-%
Mw: 645,000
Polydispersity (Mw/Mn): 3.77
Mooney viscosity (ML 1+8 at 125° C., ASTM D 1646): 52.9
Calcium stearate content: below detectable limits
Methyl cellulose content: <0.006 wt.-%—by mass balance
Irganox □ 1010: 0.03 wt.-%
Volatiles: 0.3 wt.-%
Other antiagglomerants, surfactants, emulsifiers: see above
Ions: (ICP-AES)
Aluminum (from catalyst): 83 ppm
Calcium: 10 ppm
Magnesium: 1.2 ppm
Other multivalent metal ions (Mn, Pb, Cu, Cr, Ba, Fe, Zn): 23 ppm
Monovalent metal ions (Na, K): 23 ppm
Ash: 0.01 wt.-% (ASTM D5667)
Thus the elastomer particles according to example 4g comprised
I) 100 parts by weight of a elastomer (100 phr)
II) <0.006 phr of a least one LCST compound and
III) less than 0.001 phr of non-LCST compounds selected from the group consisting of ionic or non-ionic surfactants, emulsifiers, and antiagglomerants and
IV) 0.03 phr of antioxidants
V) 0.23 phr of volatiles having a boiling point at standard pressure of 2000 or less
whereby these components made up more than 99.90 wt-% of the total weight of the elastomer particles.

Cure Experiments

Examples 5a, 5b, 6a and 6b: Low Calcium Stearate Fast Cure

The elastomer according to example 1 with an total unsaturation level of approximately 1.8 mol-% and a mooney viscosity of ~52 was isolated and dried to a residual content of volatiles of 2,000 ppm. Then 1.1 phr of calcium stearate were added to mimic commercially available butyl rubber grades. The elastomer particles obtained according to example 4a were collected by filtration, and dried to a residual content of volatiles of 2,000 ppm. The methyl cellulose content was 250 ppm.
These two elastomers were compounded using the resin-cure formulation given in table 2. Upon curing, the elastomer according to the invention showed much improved cure rate and state of cure in the same curing time/temperature.

TABLE 2

| Resin cure formulation (phr) | |
| --- | --- |
| Elastomer (Ex. 1 or 4a) | 88.6 |
| BAYPREN□ 210 MOONEY 39-47 | 5 |
| CARBON BLACK, N 330 VULCAN 3 | 50 |
| CASTOR OIL | 5 |

TABLE 2-continued

| Resin cure formulation (phr) | |
| --- | --- |
| STEARIC ACID (TRIPLE PRESSED) | 1 |
| WBC-41P* | 21.4 |

BAYPREN□ 210 MOONEY 39-47 is a polychloroprene rubber sold by LANXESS
*WBC-41P is a commercially available resin cure system of Rheinchemie Rheinau GmbH comprising 47 wt.-% SP1045, a phenolic resin based on octylphenol; 23 wt.-% zinc oxide and 30 wt.-% butyl rubber.

Compounding Procedure.

Ingredients used are listed in table 2; units are in parts per hundred rubber (phr). On a two-roll mill operating at 30° C., regular butyl rubber was combined with methyl cellulose and/or calcium stearate. To a Brabender internal mixer with a capacity of 75 ml equipped with Banbury rotors operating at 60° C. and 60 rpm, the butyl rubber from the mill was added along with 5 phr Baypren 210 Mooney 39-47. After one minute 45 phr of carbon black N330 was added. At three minutes, 5 phr carbon black N330, 5 phr Castor oil and 1 phr stearic acid were added. A sweep was performed at 4 minutes and the mixture was dumped at 6 minutes. WBC-41P was incorporated into the rubber compound on a two-roll mill operating at 30° C.

Curing

The $t_c90$ and delta torques were determined according to ASTM D-5289 with the use of a Moving Die Rheometer (MDR 2000E) using a frequency of oscillation of 1.7 Hz and a 1□arc at 180° C. for 60 minutes total run time.

| No. | MH (dNm) | ML (dNm) | MH − ML (dNm) | $t_c90$ |
| --- | --- | --- | --- | --- |
| 5a (Elastomer according to ex. 1 with 1.1 phr Calcium stearate added) | 13.5 | 2.6 | 11.0 | 41.1 |
| 6a (Elastomer according to Ex. 4a) | 17.0 | 2.8 | 14.2 | 37.7 |

MH = maximum torque, ML = minimum torque, $t_c90$ = time to 90% of maximum torque in minutes.

As evidenced by the examples the elastomer according to the invention shows superior cure behaviour as compared to its analogue comprising high levels of calcium stearate.
The elastomers produced according to examples 4d) and 4e) were also compounded according to the resin cure formulation in table 2. The sample using the elastomer according to example 4e) prepared without calcium stearate also showed the advantages in cure speed and maximum torque. In this case The $t_c90$ and delta torques were determined according to ASTM D-5289 with the use of a Moving Die Rheometer (MDR 2000E) using a frequency of oscillation of 1.7 Hz and a 10 arc at 180° C. for 30 minutes total run time.

| No. | MH (dNm) | ML (dNm) | MH − ML (dNm) | $t_c90$ |
| --- | --- | --- | --- | --- |
| 5b (Elastomer according to Ex. 4d) | 11.2 | 3.1 | 8.1 | 23.2 |
| 6b (Elastomer according to Ex. 4e) | 13.0 | 3.1 | 9.9 | 21.8 |

Other LCST Compounds

It is possible to quantify the effectiveness of an anti-agglomeration agent using a lab simulation of an aqueous slurry. For this test, 1 L of test fluid (deionized water) is heated to the desired test temperature (typically 80° C.). 100 g of uncured rubber particles (taken from commercially available sources) are added to the water and are agitated using an overhead mechanical stirrer at 700 RPM, and a baseline time to agglomeration is established. The time to agglomeration is defined as the time it takes until the rubber stirs as a single mass of crumb. Once the baseline is established, anti-agglomeration agents are evaluated by adding the agent to be tested to the water and stirring at the test temperature for 1 minute prior to the addition of rubber.

Butyl rubber particles with a mooney viscosity of 35.5 and an unsaturation level of 1.95 mol-% was obtained from a commercial manufacturing process. This crumb contained 0.5 wt.-% calcium stearate. A baseline was established for the agglomeration time of this rubber. Various anti-agglomerant compounds at various levels were then added to the water prior to subsequent tests in order to determine their capacity to extend the agglomeration time of the butyl rubber crumb. All experiments were performed twice, the results represent the average agglomeration time.

It is apparent from examples 15 to 19 where LCST compounds were employed superior antiagglomeration results are obtained compared to non-LCST anti-agglomerants or thickeners (examples 9 to 14).

| Exp. No. | Additive | Slurry Temperature (□ C.) | Amount Anti-Agglomerant (mg) | Agglomeration time 1 (h) |
|---|---|---|---|---|
| 7** | None (baseline) | 60 | na | 0.54 |
| 8** | None (baseline) | 80 | na | 0.34 |
| 9** | Calcium stearate (*1) | 80 | 10 | 0.52 |
| 10** | Calcium stearate (*1) | 80 | 500 | >1 (4.12) |
| 11** | Carboxymethyl-cellulose (*2) | 80 | 10 | 0.32 |
| 12** | Polyvinyl Stearate (*3) | 80 | 10 | 0.76 |
| 13** | Beta cyclodextrin | 80 | 10 | 0.44 |
| 14** | Methyl beta cyclodextrin | 80 | 10 | 0.42 |
| 15 | Lutensol TO 5 (*4) | 80 | 10 | >1 (1.61) |
| 16a | Methyl Cellulose (*5) | 80 | 5 | >1 (3.66) |
| 16b | Methyl Cellulose (*5) | 80 | 3 | >1 (2.08) |
| 17 | Methyl Cellulose (*5) | 60 | 5 | >1 (7.50) |
| 18 | Hydroxypropyl cellulose | 80 | 10 | >1 (1.33) |
| 19 | PolyNIPAAM (*6) | 80 | 10 | >1 (2.70) |

(*1): Added as 50 wt.-% dispersion
(*2): microgranular, Sigma
(*3): $M_w$ ~90,000 (GPC), Sigma
(*4): Ethoxylated iso-$C_{13}H_{27}$-alcohol with an ethoxylation degree of around 5
(*5): see specification above
(*6): $M_w$ 19,000-30,000
**Examples for comparison Further compounds were evaluated for their anti-agglomeration potential as above. In this case the butyl rubber evaluated had a mooney viscosity of 45.3, unsaturation of 2.34 mol-%, and a calcium stearate level of 0.42 wt.-%.

It is also apparent from examples 24 to 30 where LCST compounds were employed superior antiagglomeration results are obtained compared to non-LCST compounds (examples 21 to 23).

| Exp. No. | Additive | Slurry Temperature (□ C.) | Amount Anti-Agglomerant (mg) | Agglomeration time 1 (h) |
|---|---|---|---|---|
| 20** | None (baseline) | 80 | n.a. | 0.62 |
| 21** | Sodium stearate | 80 | 3 | 0.66 |
| 22** | Gelatin (bovine skin) | 80 | 3 | 0.72 |
| 23** | Ethyl cellulose (*10) | 80 | 3 | 0.46 |
| 24 | Lutensol TO 5 (*4) | 80 | 3 | >1 (1.61) |
| 25 | Lutensol TO 8 (*8) | 80 | 3 | >1 (1.66) |
| 26 | Hydroxyethyl cellulose (11*) | 80 | 3 | >1 (3.01) |
| 27 | Hydroxyethyl methyl cellulose (*7) | 80 | 3 | >1 (2.96) |
| 28 | Methyl Cellulose (*5) | 80 | 3 | >1 (2.39) |
| 29 | Hydroxypropyl methyl cellulose (*9) | 80 | 3 | >1 (2.31) |
| 30 | Hydroxypropyl cellulose | 80 | 3 | >1 (1.35) |

(*7): viscosity 600-1500 mPas, 2 wt.-% in water (20□ C.), Sigma
(*8): Ethoxylated iso-$C_{13}H_{27}$-alcohol with an ethoxylation degree of around 8
(*9): Viscosity 2,600 □ 5,600 cp (2 wt.-% in water at 20□ C.), H7509, Sigma
(*10): viscosity 100 cP, 5% toluene/ethanol 80:20, 48% ethoxyl, Aldrich
(11*): Mv ~1,300,000, viscosity 3,400-5,000 cP, 1 wt.-% in water (25□ C., Brookfield spindle #4, 30 rpm)
All LCST compounds employed in the experiments above exhibit a cloud point between 5 and 100□ C. as defined above.
**Examples for comparison The methods employed to determine the cloud points were:
1) DIN EN 1890 of September 2006, method A
2) DIN EN 1890 of September 2006, method C
3) DIN EN 1890 of September 2006, method E
4) DIN EN 1890 of September 2006, method A wherein the amount of compound tested is reduced from 1 g per 100 ml of distilled water to 0.05 g per 100 ml of distilled water.
5) DIN EN 1890 of September 2006, method A wherein the amount of compound tested is reduced from 1 g per 100 ml of distilled water to 0.2 g per 100 ml of distilled water.

For all LCST compounds the measurements were repeated twice to confirm reproducibility.

| LCST compound | Cloud point [□ C.] | Method |
|---|---|---|
| Lutensol TO 5 (*4) | 62.0 | 3) |
| Methyl Cellulose (*5) | 39.0 | 5) |
| Methyl Cellulose (*5) | 37.8 | 4) |
| Hydroxypropyl cellulose | 48.8 | 1) |
| PolyNIPAAM (*6) | 30.0 | 1) |
| Lutensol TO 8 (*8) | 57.8 | 1) |
| Hydroxyethyl methyl cellulose (*7) | 80.8 | 5) |
| Hydroxyethyl cellulose (11*) | 39.8 | 2) |
| Hydroxyethyl cellulose (11*) | 80.6 | 4) |
| Hydroxypropyl methyl cellulose (*9) | 48.1 | 5) |
| Hydroxypropyl methyl cellulose (*9) | 49.9 | 4) |

Further Cure Experiments:

In order to show superior performance of the elastomer s according to the invention in various typical applications the elastomer s produced according to examples 4d) to 4g) or in analogy thereto were compounded in different sulfur and resin cure formulations, either unfilled or filled.

Unfilled Resin Cure Formulations

Examples 31 and 32

The elastomer s according to example 4d (example 31) and 4e (example 32) were compounded using the resin-cure formulation given in table 3.

TABLE 3

| Unfilled resin cure formulation (phr) | |
|---|---|
| Elastomer | 88.6 |
| BAYPREN□ 210 MOONEY 39-47 | 5 |

TABLE 3-continued

| Unfilled resin cure formulation (phr) | |
|---|---|
| STEARIC ACID (TRIPLE PRESSED) | 1 |
| WBC-41P* | 21.4 |

Compounding Procedure:

To a Brabender internal mixer with a capacity of 75 ml equipped with Banbury rotors operating at 60° C. and 60 rpm, the elastomer was added along with 5 phr Baypren 210 Mooney 39-47. At three minutes, stearic acid and WBC-41P were added. The mixture was dumped when torque was stable. The elastomer compounds were further mixed on a two-roll mill operating at 30° C.

Curing

The $t_c90$, delta torques, ts1 and ts2 were determined according to ASTM D-5289 with the use of a Moving Die Rheometer (MDR 2000E) using a frequency of oscillation of 1.7 Hz and a 1☐arc at 180° C. for 60 minutes total run time.

| Ex. No. | MH (dNm) | ML (dNm) | MH − ML (dNm) | $t_s1$ (min) | $t_s2$ (min) | $t_c90$ |
|---|---|---|---|---|---|---|
| 31 | 4.82 | 1.12 | 3.7 | 8.36 | 17.72 | 45.5 |
| 32 | 5.29 | 1.09 | 4.2 | 9.48 | 18.47 | 47.4 |

MH = maximum torque, ML = minimum torque, $t_c90$ = time to 90% of maximum torque in minutes, $t_s1/t_s2$ = time to a ½ dNm rise above the minimum (ML) respectively.

As evidenced by the examples the elastomer according to the invention shows a superior cure state as compared to its analogue containing high levels of calcium stearate while preserving substantially the same scorch safety.

Examples 33 and 34

The elastomer prepared according to example 4f (example 33) and a elastomer obtainable according to example 4g (example 34) but with a level of unsaturation of 1.8 mol.-% and a Ca-level of 60 ppm while other component levels were identical or close to being identical to those of example 4g were compounded using the resin-cure formulation given in table 4.

TABLE 4

| Unfilled resin cure formulation (phr) | |
|---|---|
| Ex. 33, Ex. 34: Elastomer | 95 |
| BAYPREN☐ 210 MOONEY 39-47 | 5 |
| STEARIC ACID (TRIPLE PRESSED) | 1 |
| Zinc oxide | 5 |
| Resin SP 1045** | 10 |

**SP1045: Phenolic resin based on octylphenol

Compounding Procedure:

To a Brabender internal mixer with a capacity of 75 ml equipped with Banbury rotors operating at 60° C. and 60 rpm, the elastomer was added along with Baypren 210 Mooney 39-47. At three minutes, stearic acid, zinc oxide and Resin SP 1045 were added. The mixture was dumped when torque was stable. The elastomer compounds were further mixed on a two-roll mill operating at 30° C.

Curing

The $t_c90$, delta torques, ts1 and ts2 were determined according to ASTM D-5289 with the use of a Moving Die Rheometer (MDR 2000E) using a frequency of oscillation of 1.7 Hz and a 1☐arc at 180° C. for 60 minutes total run time.

| Ex. No. | MH (dNm) | ML (dNm) | MH − ML (dNm) | $t_s1$ (min) | $t_s2$ (min) | $t_c90$ |
|---|---|---|---|---|---|---|
| 33 | 7.48 | 1.77 | 5.71 | 3.29 | 5.86 | 37.66 |
| 34 | 9.00 | 1.84 | 7.16 | 3.04 | 4.90 | 33.03 |

As evidenced by the examples the elastomer according to the invention shows a superior cure rate and cure state as compared to its analogue containing high levels of calcium stearate.

Examples 35 to 38

The elastomer s prepared according to example 4d (examples 35 and 37) and 4e (examples 36 and 38) were compounded using the resin-cure formulation given in table 4.

TABLE 5

| Unfilled resin cure formulation (phr) | |
|---|---|
| Ex 35 to 38: Elastomer | 100 |
| STEARIC ACID (TRIPLE PRESSED) | 1 |
| Zinc oxide | 5 |
| Resin SP 1055*: | |
| Examples 35 and 36: | 10 |
| Examples 37 and 38: | 12 |

**SP1055: Phenolic resin based on brominated octylphenol

Compounding Procedure:

To a Brabender internal mixer with a capacity of 75 ml equipped with Banbury rotors operating at 60° C. and 60 rpm, the elastomer was added. At three minutes, stearic acid, zinc oxide and Resin SP 1055 were added. The mixture was dumped when torque was stable. The elastomer compounds were further mixed on a two-roll mill operating at 30° C.

Curing

The $t_c90$, delta torques, ts1 and ts2 were determined according to ASTM D-5289 with the use of a Moving Die Rheometer (MDR 2000E) using a frequency of oscillation of 1.7 Hz and a 1☐arc at 180° C. (examples 37 and 38) or 200 (examples 35 and 36) for 60 minutes total run time.

| Ex. No. | MH (dNm) | ML (dNm) | MH − ML (dNm) | $t_s1$ (min) | $t_c90$ |
|---|---|---|---|---|---|
| 35 | 4.36 | 1.08 | 3.28 | 1.63 | 16.17 |
| 36 | 5.12 | 1.08 | 4.04 | 1 | 16.03 |
| 37 | 2.23 | 0.84 | 1.39 | 7.62 | 25.11 |
| 38 | 2.61 | 0.68 | 1.93 | 11.28 | 24.44 |

As evidenced by the examples the elastomer according to the invention shows a superior cure rate and cure state as compared to its analogue containing high levels of calcium stearate.

Examples 39 and 40

In order to prove that the faster cure and the higher cure state can be used to decrease the level of curing agents, the elastomer prepared according to example 4f (example 39) and a elastomer obtainable according to example 4g (example 40) but with a level of unsaturation of 1.8 mol.-% and a Ca-level of 60 ppm while other component levels were identical or close to being identical were compounded using the resin-cure formulations given in table 6 having different levels of resin.

TABLE 6

| Unfilled resin cure formulation (phr) | |
| --- | --- |
| Ex. 39 and 40: Elastomer | 95 |
| BAYPREN☐ 210 MOONEY 39-47 | 5 |
| STEARIC ACID (TRIPLE PRESSED) | 1 |
| Zinc oxide | 5 |
| Resin SP 1045**: | |
| Example 39 (for comparison): | 7.5 |
| Example 40: | 5 |

Compounding Procedure:

To a Brabender internal mixer with a capacity of 75 ml equipped with Banbury rotors operating at 60° C. and 60 rpm, the elastomer was added along with 5 phr Baypren 210 Mooney 39-47. At three minutes, 1 phr stearic acid and Resin SP 1045 were added. The mixture was dumped when torque was stable. The elastomer compounds were further mixed on a two-roll mill operating at 30° C.

Curing

The $t_c90$, delta torques, ts1 and ts2 were determined according to ASTM D-5289 with the use of a Moving Die Rheometer (MDR 2000E) using a frequency of oscillation of 1.7 Hz and a 1☐arc at 180° C. for 60 minutes total run time.

| Ex. No. | MH (dNm) | ML (dNm) | MH − ML (dNm) | $t_s1$ (min) | $t_s2$ (min) | $t_c90$ |
| --- | --- | --- | --- | --- | --- | --- |
| 39 | 8.87 | 1.97 | 6.90 | 2.91 | 4.69 | 31.25 |
| 40 | 8.26 | 2.10 | 6.16 | 3.08 | 4.90 | 29.64 |

As evidenced by the examples the elastomer according to the invention shows even a superior cure rate and a comparable cure state as compared to its analogue containing high levels of calcium stearate with a substantially higher level of resin.

Moreover when comparing examples 33 and 40 with respect to their modulus it could be observed that with the elastomer according to the invention even using only half the amount of resin increased modulus is achieved.

| Ex. No. | Temp. (☐ C.) | Time (min) | Modulus @ 100% (MPa) | Modulus @ 200% (MPa) | Modulus @ 300% (MPa) | Tensile (Mpa) | Elongation (%) |
| --- | --- | --- | --- | --- | --- | --- | --- |
| 33 | 180 | 43 | 0.46 | 0.67 | 0.92 | 1.37 | 419.6 |
| 40 | 180 | 35 | 0.49 | 0.7 | 0.99 | 1.50 | 428.3 |

Stress strain dumbbells were cured at specified temperature (160° C. or 180° C.) for $t_c90+5$ and tested using the Alpha T2000 tensile tester. The ASTM D412 Method A procedure were followed to test samples that were unaged.

Filled Resin Cure Formulations

Examples 41 to 44

The chlorinated elastomers according to example 4d examples 41 and 43) and 4e (examples 42 and 44) were compounded using the resin-cure formulation given in table 7 having different levels of carbon black filler.

TABLE 7

| Filled resin cure formulation (phr) | |
| --- | --- |
| Ex. 41 to 44: Elastomer | 88.6 |
| BAYPREN☐ 210 MOONEY 39-47 | 5 |
| STEARIC ACID (TRIPLE PRESSED) | 1 |
| CARBON BLACK, N 330 VULCAN 3 | |
| Examples 41 and 42: | 10 |
| Examples 33 and 44: | 50 |
| WBC-41P* | 21.4 |

Compounding Procedure:

To a Brabender internal mixer with a capacity of 75 ml equipped with Banbury rotors operating at 60° C. and 60 rpm, the elastomer was added along with 5 phr Baypren 210 Mooney 39-47. After one minute carbon black N330 was added. At three minutes, stearic acid and resin were added. The mixture was dumped when torque was stable. The elastomer compounds were further mixed on a two-roll mill operating at 30° C.

Curing

The $t_c90$, delta torques, ts1 and ts2 were determined according to ASTM D-5289 with the use of a Moving Die Rheometer (MDR 2000E) using a frequency of oscillation of 1.7 Hz and a 1☐arc at 180° C. for 60 minutes total run time.

| Ex. No. | MH (dNm) | ML (dNm) | MH − ML (dNm) | $t_s1$ (min) | $t_s2$ (min) | $t_c90$ |
| --- | --- | --- | --- | --- | --- | --- |
| 41 | 6.57 | 1.17 | 5.40 | 4.92 | 9.45 | 42.88 |
| 42 | 7.51 | 1.25 | 6.26 | 5.14 | 8.85 | 41.73 |
| 43 | 18.08 | 3.07 | 15.01 | 1.17 | 2.36 | 41.63 |
| 44 | 21.92 | 3.37 | 18.55 | 1.27 | 2.50 | 39.08 |

As evidenced by the examples the elastomer according to the invention shows a superior cure rate and cure state as compared to its analogue containing high levels of calcium stearate at any level of carbon black while preserving a similar scorch safety.

Examples 45 to 48

The elastomer s according to example 4d (example 45), 4e (example 46), 4f (example 47) and a elastomer obtainable according to example 4g but with a level of unsaturation of 1.8 mol.-% and a Ca-level of 60 ppm while other component levels were identical or close to being identical with those obtained in example 4g with those obtained in example 4g (example 48) were compounded using a typical curing bladder formulation given in table 8.

TABLE 8

| Curing bladder formulation (phr) | |
| --- | --- |
| Ex. 45 to 48: Elastomer | 88.6 |
| BAYPREN☐ 210 MOONEY 39-47 | 5 |
| STEARIC ACID (TRIPLE PRESSED) | 1 |
| CARBON BLACK, N 330 VULCAN 3 | 50 |
| CASTOR OIL | 5 |
| WBC-41P* | 21.4 |

Compounding Procedure:

To a Brabender internal mixer with a capacity of 75 ml equipped with Banbury rotors operating at 60° C. and 60 rpm, the elastomer was added along with 5 phr Baypren 210 Mooney 39-47. After one minute carbon black N330 was added. At three minutes, Castor oil, stearic acid and resin were added. The mixture was dumped when torque was stable. The elastomer compounds were further mixed on a two-roll mill operating at 30° C.

Curing

The $t_c90$, delta torques, ts1 and ts2 were determined according to ASTM D-5289 with the use of a Moving Die Rheometer (MDR 2000E) using a frequency of oscillation of 1.7 Hz and a 1□arc at 180° C. for 60 minutes total run time.

| Ex. No. | MH (dNm) | ML (dNm) | MH − ML (dNm) | $t_s1$ (min) | $t_s2$ (min) | $t_c90$ |
|---|---|---|---|---|---|---|
| 45 | 13.45 | 3.25 | 10.20 | 1.65 | 3.53 | 43.54 |
| 46 | 14.91 | 3.27 | 11.64 | 1.71 | 3.22 | 37.36 |
| 47 | 14.72 | 3.20 | 11.52 | 1.60 | 2.79 | 22.60 |
| 48 | 18.95 | 3.56 | 15.39 | 1.47 | 2.40 | 18.81 |

As evidenced by the examples the elastomer according to the invention shows a superior cure rate and cure state as compared to its analogue containing high levels of calcium stearate in curing bladder formulations.

Examples 49 and 50

The elastomer s according to example 4d (example 49) and 4e (example 50), were compounded using a typical conveyor belt formulation given in table 9.

TABLE 9

| Conveyor belt formulation (phr) | |
|---|---|
| Ex. 49 and 50: Elastomer | 94 |
| Oppanol B15* | 15 |
| CARBON BLACK N220 | 50 |
| Rhenogran BCA** | 10 |
| SP1045 | 10 |

*Oppanol□ B15: Polyisobutylene having a viscosity averaged molecular weight of 85,000 g/mol sold by BASF SE
**Rhenogran□ BCA: Combination of 40% metal chlorides (tin chloride), 60% Butyl rubber sold by Rheinchemie Rheinau GmbH Compounding Procedure:

To a Brabender internal mixer with a capacity of 75 ml equipped with Banbury rotors operating at 60° C. and 60 rpm, the elastomer was added along with Oppanol 15. After one minute carbon black N220 was added. The mixture was dumped when torque was stable. The elastomer compounds were further refined and Rhenoran BCA and SP1045 were added on a two-roll mill operating at 30° C.

Curing

The $t_c90$, delta torques, ts1 and ts2 were determined according to ASTM D-5289 with the use of a Moving Die Rheometer (MDR 2000E) using a frequency of oscillation of 1.7 Hz and a 1□arc at 180° C. for 60 minutes total run time.

| Ex. No. | MH (dNm) | ML (dNm) | MH − ML (dNm) | $t_s1$ (min) | $t_s2$ (min) | $t_c90$ |
|---|---|---|---|---|---|---|
| 49 | 14.62 | 2.84 | 11.78 | 0.41 | 0.50 | 48.09 |
| 50 | 15.52 | 3.16 | 12.36 | 0.40 | 0.48 | 47.48 |

As evidenced by the examples the elastomer according to the invention shows a superior cure rate and cure state as compared to its analogue containing high levels of calcium stearate in conveyor belt formulations.

Unfilled Sulfur Cure Formulations

Examples 51 and 52

The elastomer s according to example 4d (example 51) and 4e (example 52) were compounded using the sulphur-cure formulation given in table 10.

TABLE 10

| Unfilled sulfur cure formulation (phr) | |
|---|---|
| Elastomer | 100 |
| STEARIC ACID (TRIPLE PRESSED) | 1 |
| Zinc oxide | 5 |
| TMTD* | 1 |
| Sulfur | 1.25 |
| MBT** | 1.5 |

*TMTD: Tetramethylthiuramdisulfide
**MBT: Mercaptobenzathiazole

Compounding Procedure:

To a Brabender internal mixer with a capacity of 75 ml equipped with Banbury rotors operating at 60° C. and 60 rpm, the elastomer was added and dumped after 6 mins. To the elastomer zinc oxide, T MTD, sulfur and MBT were added and mixed on a two-roll mill operating at 30° C.

Curing

The $t_c90$ and delta torques were determined according to ASTM D-5289 with the use of a Moving Die Rheometer (MDR 2000E) using a frequency of oscillation of 1.7 Hz and a 1□arc at 160° C. for 60 minutes total run time.

| Ex. No. | MH (dNm) | ML (dNm) | MH − ML (dNm) | $t_c90$ |
|---|---|---|---|---|
| 51 | 7.79 | 1.74 | 6.05 | 18.26 |
| 52 | 7.36 | 1.71 | 5.65 | 13.11 |

As evidenced by the examples the elastomer according to the invention shows a superior cure rate as compared to its analogue containing high levels of calcium stearate.

Examples 53 to 56

The elastomer s according to example 4d (examples 53 and 55) and 4e (examples 54 and 56) were compounded using the sulphur-cure formulation given in table 11.

TABLE 11

| Unfilled sulfur cure formulation (phr) | |
|---|---|
| Elastomer | 100 |
| STEARIC ACID (TRIPLE PRESSED) | 1 |
| Zinc oxide | 3 |
| TMTD | 1.2 |
| Sulfur | 1.25 |
| MBTS* | 0.5 |
| Vulkanox HS/LG** | |
| Examples 53 and 54: | 0 |
| Examples 55 and 56: | 1 |

*MBTS: Mercaptobenzathiazoles disulfide
**Vulkanox HS/LG: 2,2,4-Trimethyl-1,2-dihydroquinoline, antioxidant Compounding Procedure:

To a Brabender internal mixer with a capacity of 75 ml equipped with Banbury rotors operating at 60° C. and 60 rpm, the elastomer was added and dumped after 6 mins. To the elastomer zinc oxide, sulfur, MBTS and Vulkanox HS/LG were added and mixed on a two-roll mill operating at 30° C.

Curing

The $t_c90$ and delta torques were determined according to ASTM D-5289 with the use of a Moving Die Rheometer (MDR 2000E) using a frequency of oscillation of 1.7 Hz and a 1□arc at 160° C. for 60 minutes total run time.

| Ex. No. | MH (dNm) | ML (dNm) | MH − ML (dNm) | $t_c90$ |
|---|---|---|---|---|
| 53 | 8.47 | 1.77 | 6.70 | 19.36 |
| 54 | 8.19 | 1.75 | 6.44 | 13.36 |
| 55 | 7.74 | 1.66 | 6.08 | 20.30 |
| 56 | 7.85 | 1.72 | 6.13 | 17.79 |

As evidenced by the examples the elastomer according to the invention shows a superior cure rate as compared to its analogue containing high levels of calcium stearate.

Filled Sulfur Cure Formulations

Examples 57 and 58

The elastomer s according to example 4d (example 51) and 4e (example 52) were compounded using a typical wire and cable formulation given in table 12.

TABLE 12

| Wire and cable formulation (phr) | |
|---|---|
| Elastomer | 100 |
| Polyfil 70* | 100 |
| Mistron Talc | 25 |
| PE Wax | 5 |
| Marklube prills | 5 |
| Zinc oxide | 15 |
| Stearic acid | 0.5 |
| MBS-80** | 1.88 |
| ZDMC*** | 1.25 |
| TMTD | 1 |
| MBT | 1 |
| Akrochem AO 235**** | 1.5 |

*Polyfil 70: Calcinated kaolin clay
**MBS-80: 80% benzothiazyl-2-sulfene morpholide, 20% elastomer binder and dispersing agents
***ZDMC: Zinc dimethyl dithiocarbamate
****Akrochem AO 235: 2,2-Methylene-bis-(4-methyl-6-tert.-butyl-phenol)
Marklube prills: wax prills, used as plasticizer Compounding Procedure:

To a Brabender internal mixer with a capacity of 75 ml equipped with Banbury rotors operating at 60° C. and 60 rpm, the elastomer was added. At one minute Marklube prills, Polyfil 70, PE Wax and Mistron Talc was added and the mixture dumped after 6 mins. To the mixture the remaining components were added and mixed on a two-roll mill operating at 30° C.

Curing

The $t_c90$ and delta torques were determined according to ASTM D-5289 with the use of a Moving Die Rheometer (MDR 2000E) using a frequency of oscillation of 1.7 Hz and a 1□arc at 165° C. for 60 minutes total run time.

| Ex. No. | MH (dNm) | ML (dNm) | MH − ML (dNm) | $t_c95$ |
|---|---|---|---|---|
| 57 | 3.52 | 0.93 | 2.59 | 14.50 |
| 58 | 4.40 | 1.28 | 3.12 | 13.85 |

As evidenced by the examples the elastomer according to the invention shows a superior cure rate and cure state as compared to its analogue containing high levels of calcium stearate.

Examples 59 and 60

Preparation of Window Sealants

The elastomer s according to example 4d (example 59) and 4e (example 60) were compounded using a typical window sealant formulation given in table 13.

TABLE 12

| Window sealant formulation (wt.-%) | |
|---|---|
| Elastomer | 25 |
| Hydrocarbon Resin* | 30 |
| Calcium Carbonate | 20.5 |
| Antioxidant (Irganox 1010) | 0.5 |
| Polyisobutylene** | 24 |

*Polyisobutylene: TPC 1105 (Mw 1000) from TPC Group.
**Hydrocarbon Resin is Eastotac H-130 (hydrogenated hydrocarbon resin, having a ring and ball softening point of 130□ C.) from Eastman Chemical Company.

Compounding

To a Brabender internal mixer with a capacity of 75 ml equipped with Banbury rotors operating at 60° C. and 60 rpm, the ingredients according to table 12 were added according to the protocol given in table 13.

TABLE 13

| Mixing procedure for the window sealant formulation | |
|---|---|
| 0 sec | Added polymers |
| 1 min | Added antioxidant, (¼) hydrocarbon resin, (¼) calcium carbonate |
| 5 mins | (¼) hydrocarbon resin, (⅓) polyisobutylene, (¼) calcium carbonate Additional increments of ingredients were added on instantaneous torque recovery. |
| ~30 mins | Finished after constant torque levels were obtained |

Evaluation of Chemical Fogging

Evaluation of chemical fogging was done by heating the elastomer s employed in the window sealant formulation at 90° C. for 24 hours in the presence of a cold finger held at ~15° C. above the elastomer to condense any vapors coming off the rubber. In example 60 no condensation on the cold finger was observed while in example 59 a white condensate was observed. This white condensate contained stearic acid originating from the calcium stearate present in the elastomer according to example 4d.

The invention claimed is:

1. A process for the preparation of an aqueous slurry comprising a plurality of elastomer particles suspended therein, the process comprising:

A) contacting an organic medium comprising i) at least one elastomer, and ii) an organic diluent with an aqueous medium comprising at least one lower critical solution temperature (LCST) compound having a cloud point of 0 to 100° C.; and B) removing at least partially the organic diluent to obtain an aqueous slurry comprising elastomer particles.

2. The process according to claim 1, wherein the LCST compounds are those having a cloud point of 15 to 80° C. determined by at least one of the following methods:
   DIN EN 1890 of September 2006, method A
   DIN EN 1890 of September 2006, method C
   DIN EN 1890 of September 2006, method E
   DIN EN 1890 of September 2006, method A wherein the amount of compound tested is reduced from 1 g per 100 ml of distilled water to 0.05 g per 100 ml of distilled water
   DIN EN 1890 of September 2006, method A wherein the amount of compound tested is reduced from 1 g per 100 ml of distilled water to 0.2 g per 100 ml of distilled water.

3. The process according to 1, wherein the elastomers include butyl rubbers and halogenated butyl rubbers, polyisobutylene, ethylene propylene diene M-class rubbers (EPDM), nitrile butadiene rubbers (NBR), hydrogenated nitrile butadiene rubbers (HNBR) and styrene-butadiene rubbers (SBR).

4. The process according to claim 1, wherein the organic medium is obtained from a polymerization reaction or a post-polymerization reaction.

5. The process according to claim 1, wherein the aqueous medium comprises 0 to 5,000 ppm of salts of mono or multivalent metal ions calculated on their metal content and with respect to the amount of elastomer present in the organic medium.

6. The process according to claim 1, wherein the aqueous phase comprises 1 to 2,000 ppm of antioxidants calculated with respect to the amount of elastomer present in the organic medium.

7. The process according to claim 1, wherein the weight average molecular weight of the elastomer is 10 to 2,000 kg/mol.

8. The process according to claim 1, wherein a polydispersity of the elastomers is 1.5 to 4.5 as measured by the ratio of weight average molecular weight to number average molecular weight as determined by gel permeation chromatography.

9. The process according to claim 1, wherein the elastomer has a Mooney viscosity of at least 10 (ML 1+8 at 125° C., ASTM D 1646).

10. The process according to claim 1, wherein the organic medium is obtained by a process comprising polymerizing at least one polymerizable monomer in the presence of an organic diluent and an initiator system or catalyst to form an organic medium comprising the elastomer, the organic diluent, and optionally residual monomers.

11. The process according to claim 1, wherein the organic medium is obtained by a process comprising polymerizing monomers comprising at least one isoolefin monomer and at least one multiolefin monomer in the presence of an organic diluent and an initiator system to form an organic medium comprising the elastomer, the organic diluent, and optionally residual monomers.

12. The process according to claim 11, wherein the at least one isoolefin is selected from the group consisting of isoolefin monomers having 4 to 16 carbon atoms.

13. The process according to claim 11, wherein the at least one multiolefin is selected from the group consisting of isoprene, butadiene, 2-methylbutadiene, 2,4-dimethylbutadiene, piperyline, 3-methyl-1,3-pentadiene, 2,4-hexadiene, 2-neopentylbutadiene, 2-methyl-1,5-hexadiene, 2,5-dimethyl-2,4-hexadiene, 2-methyl-1,4-pentadiene, 4-butyl-1,3-pentadiene, 2,3-dimethyl-1,3-pentadiene, 2,3-dibutyl-1,3-pentadiene, 2-ethyl-1,3-pentadiene, 2-ethyl-1,3-butadiene, 2-methyl-1,6-heptadiene, cyclopentadiene, methylcyclopentadiene, cyclohexadiene and 1-vinyl-cyclohexadiene.

14. The process according to claim 11, wherein the polymerization is carried out either as slurry polymerization or solution polymerization.

15. The process according to claim 11, wherein the polymerization is carried out batchwise or continuously.

16. The process according to claim 1, wherein the at least one LCST compound Is selected from the group consisting of: poly(N-isopropylacrylamide), poly(N-isopropylacrylamide-co-N,N-dimethylacrylamide), poly(N-isopropylacrylamide)-alt-2-hydroxyethylmethacrylate, poly(N-vinylcaprolactam), poly(N,N-diethylacrylamide), poly[2-(dimethylamino)ethyl methacrylate], poly(2-oxazoline) glycopolymers, Poly(3-ethyl-N-vinyl-2-pyrrolidone), hydroxybutyl chitosan, polyoxyethylene (20) sorbitan monostearate, polyoxyethylene (20) sorbitan monolaurate, polyoxyethylene (20) sorbitan monooleate, methyl cellulose, hydroxypropyl cellulose, hydroxyethyl methylcellulose, hydroxypropyl methylcellulose, poly(ethylene glycol) methacrylates with 2 to 6 ethylene glycol units, polyethyleneglycols, preferably those with 2 to 6 ethylene glycol units and 2 to 6 polypropylene units, compounds of formula (I)

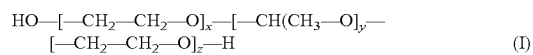

with y=3 to 10 and x and z=1 to 8, whereby y+x+z is from 5 to 18, with 2 to 8 ethylene glycol units and 2 to 8 polypropylene units,
ethoxylated iso-$C_{13}H_{27}$-alcohols, polyethylene glycol with 4 to 50 ethyleneglycol units, polypropylene glycol with 4 to 30 propyleneglycol units, polyethylene glycol monomethyl, dimethyl, monoethyl and diethyl ether with 4 to 50 ethyleneglycol units, polypropylene glycol monomethyl, dimethyl, monoethyl and diethyl ether with 4 to 50 propyleneglycol units.

17. The process according to claim 1, wherein the amount of the at least one LCST compound present in the aqueous medium is 1 to 20,000 ppm with respect to the amount of elastomer present in the organic medium; and the LCST compounds exhibit a molecular weight of at least 1,500 g/mol.

18. The process according to claim 17, wherein the LCST compounds exhibit a molecular weight of at least 4,000 g/mol and have a cloud point of 20 to 70° C.

19. The process according to claim 1, further comprising C) separating the elastomer particles contained in the aqueous slurry obtained according to step B) to isolate the elastomer particles.

20. The process according to claim 19, further comprising drying the isolated elastomer particles.

21. An aqueous slurry obtained by the process according to claim 1.

22. An elastomer composition comprising:
   I) 96.0 wt. % or more of an elastomer;
   II) 0 to 3.0 wt. % of salts of mono- or multivalent metal ions; and
   II) 1 ppm to 5,000 ppm of at least one LCST compound.

23. The elastomer composition of claim 22, wherein the composition comprises:

I) 100 parts by weight of the elastomer;
II) 0.0001 to 0.5 parts by weight of the least one LCST compound;
III) no or 0.0001 to 3.0 parts by weight of salts of mono- or multivalent metal ions;
IV) no or 0.005 to 0.3 parts by weight of antioxidants; and
V) 0.005 to 1.5 parts by weight of volatiles having a boiling point at standard pressure of 200° C. or less.

24. The process according to claim 20, further comprising:
 drying the elastomer particles to a residual content of volatiles of 7,000 or less; and
 shaping of the dried elastomer particles to obtain reshaped elastomer particles.

* * * * *